United States Patent
Samples

(10) Patent No.: US 10,776,695 B1
(45) Date of Patent: Sep. 15, 2020

(54) INTELLIGENT RECOGNITION AND ALERT METHODS AND SYSTEMS

(71) Applicant: AI CONCEPTS, LLC, Carrollton, GA (US)

(72) Inventor: Johnathan Samples, Carrollton, GA (US)

(73) Assignee: AI Concepts, LLC, Carrollton, GA (US)

(*) Notice: Subject to any disclaimer, the term of this patent is extended or adjusted under 35 U.S.C. 154(b) by 0 days.

(21) Appl. No.: 16/297,502

(22) Filed: Mar. 8, 2019

(51) Int. Cl.
G06N 3/08 (2006.01)
G06F 9/54 (2006.01)
G06K 9/62 (2006.01)
G06K 9/00 (2006.01)

(52) U.S. Cl.
CPC .............. *G06N 3/08* (2013.01); *G06F 9/542* (2013.01); *G06K 9/00711* (2013.01); *G06K 9/6267* (2013.01)

(58) Field of Classification Search
CPC ...... G06N 3/08; G06F 9/542; G06K 9/00711; G06K 9/6267
See application file for complete search history.

(56) References Cited

U.S. PATENT DOCUMENTS 7,447,333 B1* 11/2008 Masticola ............ A61B 5/1123
382/103
7,683,929 B2* 3/2010 Elazar ................... G01S 3/7864
348/169
9,881,216 B2 1/2018 Buehler
2004/0062442 A1 4/2004 Laumeyer et al.
2009/0074261 A1 3/2009 Haupt et al.
2013/0229536 A1 9/2013 Boncyk et al.

(Continued)

FOREIGN PATENT DOCUMENTS

CN 108154115 A 6/2018
TW 201704717 A 2/2017

(Continued)

OTHER PUBLICATIONS

Ranjan, Rajeev, et al. "An all-in-one convolutional neural network for face analysis." 2017 12th IEEE International Conference on Automatic Face & Gesture Recognition (FG 2017). IEEE, 2017. (Year: 2017).*

(Continued)

*Primary Examiner* — Eric Nilsson
(74) *Attorney, Agent, or Firm* — Bekiares Eliezer LLP

(57) ABSTRACT

An intelligent target object detection and alerting platform may be provided. The platform may receive a content stream from a content source. A target object may be designated for detection within the content stream. A target object profile associated with the designated target object may be retrieved from a database of learned target object profiles. The learned target object profiles may be associated with target objects that have been trained for detection. At least one frame associated with the content stream may be analyzed to detect the designated target object. The analysis may comprise employing a neural net, for example, to detect each target object within each frame. A parameter for communicating target object detection data may be specified. In turn, when the parameter is met, the detection data may be communicated.

30 Claims, 21 Drawing Sheets

(56) References Cited

U.S. PATENT DOCUMENTS

| | | |
|---|---|---|
| 2014/0275824 A1 | 9/2014 | Couse |
| 2016/0139977 A1* | 5/2016 | Ashani .............. G06F 11/0706 |
| | | 714/26 |
| 2016/0205418 A1 | 7/2016 | Ho |
| 2018/0330238 A1* | 11/2018 | Luciw .................... G06N 3/08 |

FOREIGN PATENT DOCUMENTS

| | | |
|---|---|---|
| WO | WO2016004673 A1 | 1/2016 |
| WO | 2016026447 A1 | 2/2016 |
| WO | WO2017037201 A1 | 3/2017 |
| WO | WO2018081610 A1 | 5/2018 |

OTHER PUBLICATIONS

International Search Report and Written Opinion dated Jul. 20, 2020 cited in Application No. PCT/US2020/021684, 17 pgs.

Sankaranarayanan et al., "Object Detection, Tracking and Recognition for Multiple Smart Cameras," Proceedings of the IEEE, vol. 96, No. 10, Oct. 2008, pp. 1606-1624.

\* cited by examiner

INTELLIGENT RECOGNITION AND ALERT METHODS AND SYSTEMS

FIELD OF DISCLOSURE

The present disclosure generally relates to intelligent filtering and intelligent alerts for target object detection in a content source.

BACKGROUND

Trail cameras and surveillance cameras often send image data that may be interpreted as false positives for detection of certain objects. These false positives can be caused by the motion of inanimate objects like limbs or leaves. False positives can also be caused by the movement of animate objects that are not being studied or pursued. The conventional strategy is to provide an end user with all captured footage. This often causes problems because the conventional strategy requires the end user to scour through a plurality of potentially irrelevant frames.

Furthermore, to provide just one example of a technical problem that may be addressed by the present disclosure, it is becoming increasingly important to monitor cervid populations and track the spread chronic diseases, including, without limitation, Chronic Wasting Disease (CWD). CWD has been found in approximately 50% of the states within the United States, and attempts must be made to contain the spread and eradicate affected animals. This often causes problems because the conventional strategy does not address the recognition of affected populations early enough to prevent further spreading of the disease.

Finally, it is also becoming increasingly important to monitor the makeup of animal populations based on age, sex and species. Being able to monitor by such categories allows interested parties, such as the Department of Natural Resources in various states, to properly track and monitor the overall health of large populations of relevant species within the respective state.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure may provide a method for intelligent recognition and alerting. The method may begin with receiving a content stream from a content source, the content source comprising at least one of the following: a capturing device, and a uniform resource locator. At least one target object may be designated for detection within the content stream. A target object profile associated with each designated target object may be retrieved from a database of learned target object profiles. The database of learned target object profiles may be associated with target objects that have been trained for detection. Accordingly, at least one frame associated with the content stream may be analyzed for each designated target object. The analysis may comprise employing a neural net, for example, to detect each target object within each frame by matching aspects of each object within a frame to aspects of the at least one learned target object profile.

At least one parameter for communicating target object detection data may be specified to notify an interested party of detection data. The at least one parameter may comprise, but not be limited to, for example: at least one aspect of the at least one detected target object and at least one aspect of the content source. In turn, when the at least one parameter is met, the target object detection data may be communicated. The communication may comprise, for example, but not be limited to, transmitting the at least one frame along with annotations associated with the detected at least one target object and transmitting a notification comprising the target object detection data.

Still consistent with embodiments of the present disclosure, an AI Engine may be provided. The AI engine may comprise, but not be limited to, for example, a content module, a recognition module, and an analysis module.

The content module may be configured to receive a content stream from at least one content source.

The recognition module may be configured to:
match aspects of the content stream to at least one learned target object profile from a database of learned target object profiles to detect target objects within the content, and upon a determination that at least one of the detected target objects corresponds to the at least one learned target object profile:
classify the at least one detected target object based on the at least one learned target object profile, and
update the at least one learned target object profile with at least one aspect of the at least one detected target object.

The analysis module may be configured to:
process the at least one detected target object through a neural net for a detection of learned features associated with the at least one detected target object, wherein the learned features are specified by the at least one learned target object profile associated with the at least one detected target object,
determine, based on the process, the following:
a gender of the at least one detected target object,
an age of the at least one detected target object,
a health of the at least one detected target object, and
a score for the at least one detected target object, and
update the learned target object profile with the detected learned features.

In yet further embodiments of the present disclosure, a system comprising at least one capturing device, at least one end-user device, and an AI engine may be provided.

The least one capturing device may be configured to:
register with an AI engine,
capture at least one of the following:
visual data, and
audio data,
digitize the captured data, and
transmit the digitized data as at least one content stream to the AI engine.

The at least one end-user device may be configured to:
configure the at least one capturing device to be in operative communication with the AI engine,
define at least one zone, wherein the at least one end-user device being configured to define the at least one zone comprises the at least one end-user device being configured to:
specify at least one content source for association with the at least one zone, and
specify the at least one content stream associated with the at least one content source, the specified at least one content stream to be processed by the AI engine for the at least one zone, specify at least one zone parameter from a plurality of
  zone parameters for the at least one zone, wherein the
  zone parameters comprise:
    a plurality of selectable target object designations for
      detection within the at least one zone, the target
      object designations being associated with a plurality
      of learned target object profiles trained by the AI
      engine,
specify at least one alert parameter from a plurality of
  alert parameters for the at least one zone, wherein the
  alert parameters comprise:
    triggers for an issuance of an alert,
    recipients that receive the alert,
    actions to be performed when an alert is triggered, and
    restrictions on issuing the alert,
  receive the alert from the AI engine, and
  display the detected target object related data associated
    with the alert, wherein the detected target object related
    data comprises at least one frame from the at least one
    content stream.

The AI engine of the system may comprise a content module, a recognition module, an analysis module, and an interface layer.

The content module may be configured to receive the content stream from the at least one capturing device.

The recognition module may be configured to:
  match aspects of the content stream to at least one learned
    target object profile in a database of the plurality of
    learned target object profiles trained by the AI engine to
    detect target objects within the content, and upon a
    determination that at least one of the detected target
    objects corresponds to the at least one learned target
    object profile:
      classify the at least one detected target object based on
        the at least one learned target object profile, and
      update the at least one learned target object profile with
        at least one aspect of the at least one detected target
        object;
an analysis module configured to:
  process the at least one detected target object through a
    neural net for a detection of learned features associated
    with the at least one detected target object, wherein the
    learned features are specified by the at least one learned
    target object profile associated with the at least one
    detected target object,
  determine, based on the process, the following attributes
    of the at least one detected target object:
      a gender of the at least one detected target object,
      an age of the at least one detected target object,
      a health of the at least one detected target object, and
      a score for the at least one detected target object,
  update the learned target object profile with the detected
    learned features, and
  determine whether the at least one detected target object
    corresponds to at least one of the target object designations associated with the zone specified at the end-user device, and
  determine whether the attributes associated with the at
    least one detected object correspond to the triggers for
    the issuance of the alert.
The interface layer may be configured to:
  communicate the detected target object data to the at least
    one end-user device, wherein the detected target object
    related data comprises at least one of the following:
      at least one frame along with annotations associated
        with the detected at least one target object, and
      a push notification to the at least one end-user device.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
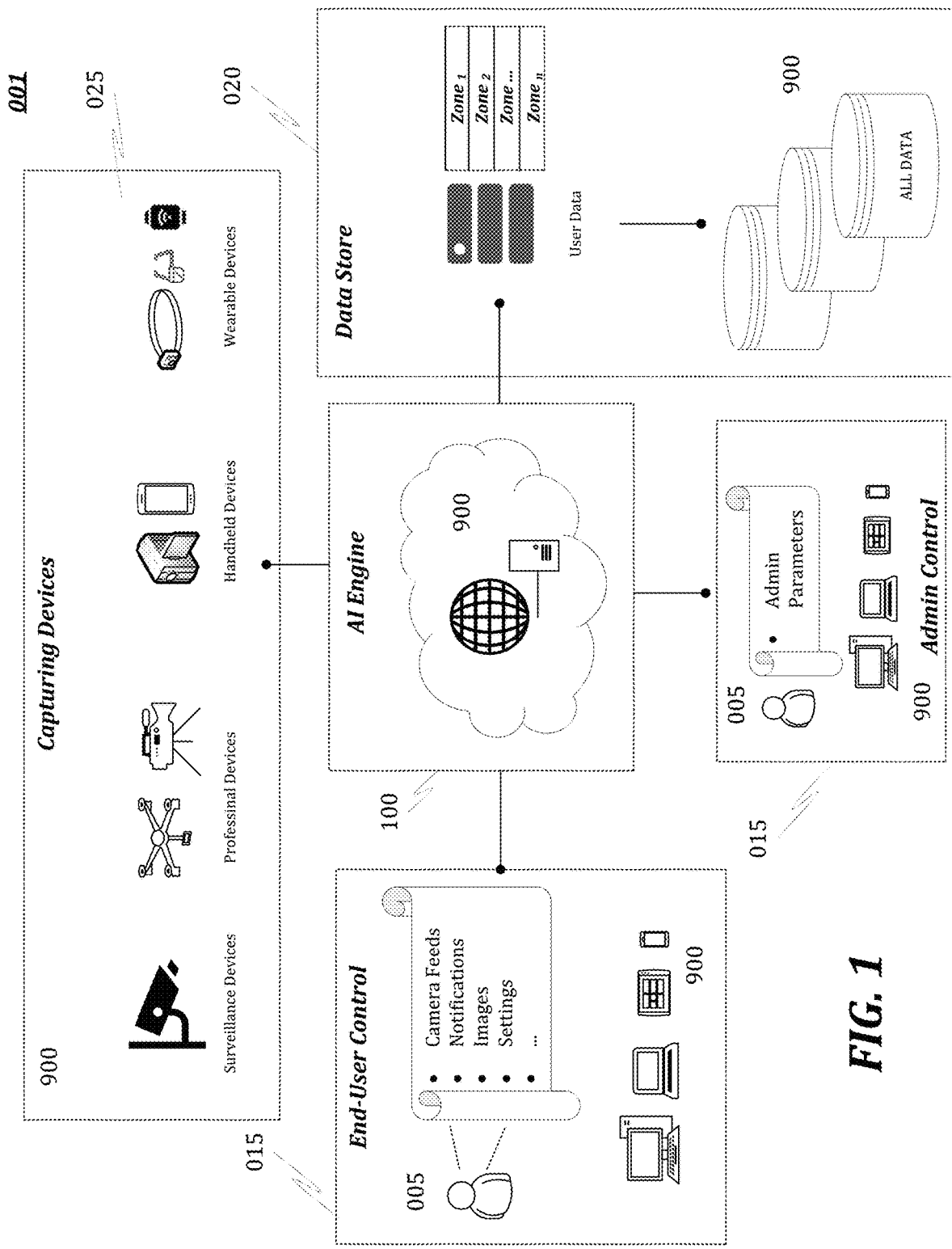
FIG. 1 illustrates a block diagram of an operating environment consistent with some embodiments of the present disclosure.

As a preliminary matter, it will readily be understood by one having ordinary skill in the relevant art that the present disclosure has broad utility and application. As should be understood, any embodiment may incorporate only one or a plurality of the following aspects of the disclosure and may further incorporate only one or a plurality of the following features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of animal detection and tracking, embodiments of the present disclosure are not limited to use only in this context. Rather, any context in which objects may be identified within a data stream in accordance to the various methods and systems described herein may be considered within the scope and spirit of the present disclosure.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure provide methods, systems, and devices (collectively referred to herein as "the platform") for intelligent object detection and alert filtering. The platform may comprise an AI engine. The AI engine may be configured to process content (e.g., a video stream) received from one or more content sources (e.g., a camera). For example, the AI engine may be configured to connect to remote cameras, online feeds, social networks, content publishing websites, and other user content designations. A user may specify one or more content sources for designation as a monitored zone.

Each monitored zone may be associated with target objects to detect and optionally track within the content provided by the content source. Target objects may include, for example, but not be limited to: deer (buck, doe, diseased), pigs, fish, turkey, bobcat, human, and other animals. Target objects may also include inanimate objects, such as, but not limited to vehicles (ATV, mail truck, etc.), drones, planes, and devices. However, the scope of the present disclosure, as will be detailed below, is not limited to any particular animate or inanimate object. Furthermore, each zone may comprise alert parameters defining one or more actions to be performed by the platform upon a detection of a target object.

In turn, the AI engine may monitor for the indication of target objects within the content associated with the zone. Accordingly, the content may be processed by the AI engine to detect target objects. Detection of the target objects may trigger alerts or notifications to one or more interested parties via a plurality of mediums. In this way, interested parties may be provided with real-time information as to where and when the specified target objects are detected within the content sources and/or zones.

Further still, embodiments of the present disclosure may provide for intelligent filtering. Intelligent filtering may allow platform users to only see content that contain target objects, thereby preventing content overload and ease of use. In this way, users will not need to scan through endless pictures of falling leaves, snowflakes, squirrels, that would otherwise trigger false detections.

Furthermore, the platform may provide activity reports, statistics, and other analytics that enable a user to track selected target objects and determine where and when, based on zone designation, those animals are active. As will be detailed below, some implementations of the platform may facilitate the detection, tracking, and assessment of diseased animals.

Embodiments of the present disclosure may comprise methods, systems, and a computer readable medium comprising, but not limited to, at least one of the following:
  A. Content Module;
  B. Recognition Module;
  C. Analysis Module;
  D. Interface Layer; and
  E. Data Store Layer.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage disclosed within each module can be considered independently without the context of the other stages within the same module or different modules. Each stage may contain language defined in other portions of this specifications. Each stage disclosed for one module may be mixed with the operational stages of another module. In the present disclosure, each stage can be claimed on its own and/or interchangeably with other stages of other modules.

The following depicts an example of a method of a plurality of methods that may be performed by at least one of the aforementioned modules. Various hardware and software components may be used at the various stages of operations disclosed with reference to each module. For example, although methods may be described to be performed by a single computing device, it should be understood that, in some embodiments, different operations may be performed by different networked elements in operative communication with the computing device. For example, one or more computing devices 900 may be employed in the performance of some or all of the stages disclosed with regard to the methods. Similarly, capturing devices 025 may be employed in the performance of some or all of the stages of the methods. As such, capturing devices 025 may comprise at least those architectural components as found in computing device 900.

Furthermore, although the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed without altering or deterring from the fundamental scope of the depicted methods and systems disclosed herein.

Consistent with embodiments of the present disclosure, a method may be performed by at least one of the aforementioned modules. The method may be embodied as, for example, but not limited to, executable machine code, which when executed, performs the method.

The method may comprise the following stages or sub-stages, in no particular order: classifying target objects for detection within a data stream; specification of target objects to be detected in the data stream; specifying alert parameters for indicating a detection of the target objects in the data stream; and recording other attributes derived from a detection of the target objects in the data stream, including, but not limited to, time, date, age, sex and other attributes.

In some embodiments, the method may further comprise the stages or sub-stages of creating, maintaining, and updating target object profiles. Target object profiles may include a specification of a plurality of aspects used for detecting the target object in a data stream (e.g., object appearance, behaviors, time of day, and many others). The object profile may be created and updated at the AI training stage during platform operation.

In various embodiments, the object profile may be universal or, in other words, available to more than one user of the platform, which may have no relation to each other and be independent of one another. For example, a first user may be enabled to, either directly or indirectly, perform an action that causes the AI engine 100 to receive training data for the classification of a certain target object. The target object's profile may be created based on the initial training. The target object profile may then be made available to a second user. The second user may select a target object for detection based on the object profile trained for the first user.

Furthermore, in some embodiments, the second user may then, either directly or indirectly, perform an action to re-train or otherwise update the target object profile. In this way, more than one platform user, dependent or independent, may be enabled to employ the same object profile and share updates in object detection training across the platform.

In yet further embodiments, the target object profile may comprise a recommended or default set of alert parameters (e.g., AI confidence or alert threshold settings). Accordingly, a target object profile may comprise an AI model and various alert parameters that are suggested for the target object. In this way, a user selecting a target object may be provided with an optimal set of alert parameters tailored to the object. These alert parameters may be determined by the platform during a training or re-training phases associated with the target object profile.

Consistent with embodiments of the present disclosure, the method may comprise the following stages or sub-stages, in no particular order: receiving multimedia content from a data stream; processing the multimedia content to detect objects within the content; and determining whether a detected object matches a target object.

The multimedia content may comprise, for example, but not be limited to, sensor data, such as image and/or audio data. The AI engine may, in turn, be enabled to detect objects by processing the sensor data. The processing may be based on, for example, but not be limited to, a comparison of the detected objects to target object profiles. In some embodiments, additional training may occur during the analysis and result in an update of the target object profiles.

Still consistent with embodiments of the present disclosure, the method may comprise the following stages or sub-stages, in no particular order: specifying at least one detection zone; associating at least one content capturing device with a zone; defining alert parameters for the zone; and triggering an alert for the zone upon a detection of a target object by the AI engine.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 illustrates one possible operating environment through which a platform 001 consistent with embodiments of the present disclosure may be provided. By way of non-limiting example, platform 001 may be hosted on, in part or fully, for example, but not limited to, a cloud computing service. In some embodiments, platform 001 may be hosted on a computing device 900 or a plurality of computing devices 900. The various components of platform 001 may then, in turn, operate with the AI engine 100 via one or more computing devices 900.

For example, an end-user 005 or an administrative user 005 may access platform 001 through an interface layer 015. The software application may be embodied as, for example, but not be limited to, a website, a web application, a desktop application, and a mobile application compatible with a computing device 900. One possible embodiment of the software application may be provided by the HuntPro™ suite of products and services provided by AI Concepts, LLC. As will be detailed with reference to FIG. 22 below, computing device 900 may serve to host or execute the software application for providing an interface to operate platform 001. The interface layer 015 may be provided to, for example, but not limited to, an end-user, an admin user. The interface layer 015 may be provided on a capturing device, on a mobile device, a web application, or another computing device 900. The software application may enable a user to interface with the AI engine 100 via, for example, a computing device 900.

Still consistent with embodiments of the present disclosure, a plurality of content capturing devices 025 may be in operative communication with AI engine 100 and, in turn, interface with one or more users 005. In turn, a software application on a user's device may be operative to interface with and control the content capturing devices 025. In some embodiments, a user device may establish a direct channel in operative communication with the content capturing devices 025. In this way, the software application may be in operative connection with a user device, a capturing device, and a computing device 900 operating the AI engine 100.

Accordingly, embodiments of the present disclosure provide a software and hardware platform comprised of a distributed set of computing elements, including, but not limited to the following.

1. Capturing Device 025

Embodiments of the present disclosure may provide a content capturing device 025 for capturing and transmitting data to the AI Engine 100 for processing. Capturing Devices may be comprised of a multitude of devices, such as, but not limited to, a sensing device that is configured to capture and transmit optical, audio, and telemetry data.

A capturing device 025 may include, but not be limited to:
   a surveillance device, such as, but not limited to:
      motion sensor, and
      a webcam;
   a professional device, such as, but not limited to:
      video camera, and
      drone;
   handheld device, such as, but not limited to:
      camcorder, and
      smart phone;
   wearable device, such as, but not limited to:
      helmet mounted camera, and
      eye-glass mounted camera; and
   a remote device, such as, but not limited to: cellular trail camera, such as, but not limited to traditional cellular camera and a Commander 4G LTE cellular camera; and
   Cellular motion sensor Content capturing device 025 may comprise one or more of the components disclosed with reference to computing device 900. In this way, capturing device 025 may be capable to perform various processing operations.

In some embodiments, the content capturing device 025 may comprise an intermediary device from which content is received. For example, content from a capturing device 025 may be received by a computing device 900 or a cloud service with a communications module in communication with the capturing device 025. In this way, the capturing device 025 may be limited to a short-range wireless or local area network, while the intermediary device may be in communication with AI engine 100. In other embodiments, a communications module residing locally to the capturing device 025 may be enabled for communications directly with AI engine 100.

Capturing devices may be operated by a user 005 of the platform 001, crowdsourced, or publicly available content feeds. Still consistent with embodiments of the present disclosure, content may be received from a content source. The content source may comprise, for example, but not be limited to, a content publisher such as YouTube®, Facebook, or another content publication platform. A user 005 may provide, for example, a uniform resource locator (URL) for published content. The content may or may not be owned or operated by a user. The platform 001 may then, in turn, be configured to access the content associated with the URL and extract the requisite data necessary for content analysis in accordance to the embodiments of the present disclosure.

2. Data Store 020

Consistent with embodiments of the present disclosure, platform 001 may store, for example, but not limited to, user profiles, zone designations, and object profiles. These stored elements, as well as others, may all be accessible to AI engine 100 via a data store 020.

User data may include, for example, but not be limited to, a user name, email login credentials, device IDs, and other personally identifiable and non-personally identifiable data. In some embodiments, the user data may be associated with target object classifications. In this way, each user 005 may have a set of target objects trained to the user's 005 specifications. In additional embodiments, the object profiles may be stored by data store 020 and accessible to all platform users 005.

Zone designations may include, but not be limited to, various zones and zone parameters such as, but not limited to, device IDs, device coordinates, geo-fences, alert parameters, and target objects to be monitored within the zones. In some embodiments, the zone designations may be stored by data store 020 and accessible to all platform users 005.

3. Interface Layer 015

Embodiments of the present disclosure may provide an interface layer 015 for end-users 005 and administrative users 005 of the platform 001. Interface layer 015 may be configured to allow a user 005 to interact with the platform and to initiate and perform certain actions, configuration, monitoring, and receive alerts. Accordingly, any and all user interaction with platform 001 may employ an embodiment of the interface layer 015.

Interface layer 015 may provide a user interface (UI) in multiple embodiments and be implemented on any device such as, for example, but not limited to:

Capturing Device;
Streaming Device;
Mobile device; and
Any other computing device 900.

The UI may consist of components/modules which enable user 005 to, for example, configure, use, and manage capturing devices for operation within platform 001. Moreover, the UI may enable a user to configure multiple aspects of platform 001, such as, but not limited to, zone designations, alert settings, and various other parameters operable in accordance to the embodiments of this disclosure.

An interface layer 015 may enable an end-user to control various aspects of platform 001. The interface layer 015 may interface directly with user 005, as will be detailed in section (III) of this present disclosure. The interface layer 015 may provide the user 005 with a multitude of functions, for example, but not limited to, access to feeds from capturing devices, upload capability, content source specifications, zone designations, target object specifications, alert parameters, training functionality, and various other settings and features.

An interface layer 015 may provide alerts, which may also be referred to as notifications. The alerts may be provided to a single user ˆ06, or a plurality of users 005, according to the aforementioned alert parameters. The interface layer 015 and alerts may provide user(s) 005 access to live content streams 405. In some embodiments, the content streams 405 may be processed by the AI engine 100 in real time. The AI engine 100 may also provide annotations superimposed over the content streams 405. The annotations may include, but are not limited to, markers over detected target objects, name of the detected target objects, confidence level of detection, current date/time/temperature, name of the zone, name associated with the current capturing device 025, and any other learned feature (as illustrated in FIGS. 17-21).

In another aspect, an interface layer 015 may enable an administrative user 005 to control various parameters of platform 001. The interface layer 015 may interface directly with administrative user 005, similar to end-user, to provide control over the platform 001, as will be detailed in section (III) of this present disclosure. Control of the platform 001 may include, but not be limited to, maintenance, security, upgrades, user management, data management, and various other system configurations and features. The interface layer 015 may be embodied in a graphical interface, command line interface, or any other UI to allow the user 005 to interact with the platform 001.

4. AI Engine 100

Figure 2:
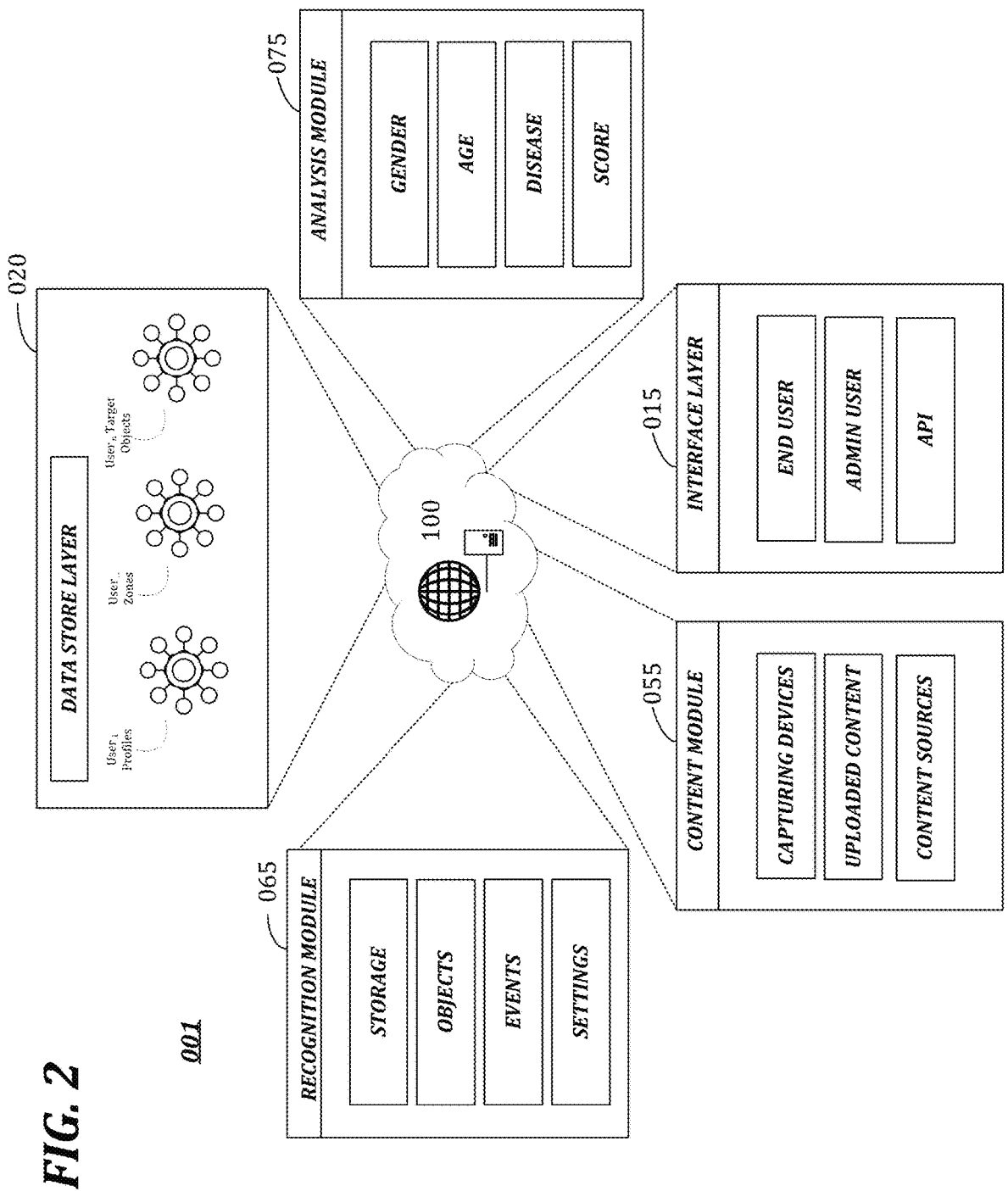
FIG. 2 illustrates a block diagram of an operating environment consistent with some embodiments the present disclosure.

Embodiments of the present disclosure may provide the AI engine 100 configured to, for example, but not limited to, receive content, perform recognition methods on the content, and provide analysis, as disclosed by FIG. 2. In some embodiments, AI engine 100 may receive or output data to third party systems. Still, in some embodiments, AI engine 100 may be configured to provide an interface layer 015 and a data store layer 020 for enabling input data streams to AI engine 100, as well as an output provision to third party systems and user devices from AI engine 100. Referring now to FIG. 2, embodiments of the present disclosure provide an AI engine 100, within a software and/or hardware platform, comprised of a set of modules. In some embodiments consistent with the present disclosure, the modules may be distributed. The modules comprise, but not limited to:

A. Content Module 055;
B. Recognition Module 065; and
C. Analysis Module 075.

In some embodiments, the present disclosure may provide an additional set of modules for further facilitating the software and/or hardware platform. The additional set of modules may comprise, but not be limited to:

D. Interface Layer 015; and
E. Data Store Layer 020.

The aforementioned modules and functions and operations associated therewith may be operated by a computing device 900, or a plurality of computing devices 900. In some embodiments, each module may be performed by separate, networked computing devices 900; while in other embodiments, certain modules may be performed by the same computing device 900 or cloud environment. Though the present disclosure is written with reference to a centralized computing device 900 or cloud computing service, it should be understood that any suitable computing device 900 may be employed to provide the various embodiments disclosed herein.

Details with regards to each module is provided below. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage disclosed within each module can be considered independently without the context of the other stages within the same module or different modules. Each stage may contain language defined in other portions of this specifications. Each stage disclosed for one module may be mixed with the operational stages of another module. In the present disclosure, each stage can be claimed on its own and/or interchangeably with other stages of other modules.

Accordingly, embodiments of the present disclosure provide a software and/or hardware platform comprised of a set of computing elements, including, but not limited to, the following.

A. Content Module 055

A content module 055 may be responsible for the input of content to AI engine 100. The content may be used to, for example, perform object detection and tracking, or training for the purposes of object detection and tracking. The input content may be in various forms, including, but not limited to streaming data, received either directly or indirectly from capturing devices 025. In some embodiments, capturing devices 025 may be configured to provide content as a live feed, either directly by way of a wired or wireless connection, or through an intermediary device as described above. In other embodiments, the content may be static or prerecorded.

In various embodiments, capturing devices 025 may be enabled to transmit content to AI engine 100 only upon an active state of content detection. For example, should capturing devices 025 not detect any change in the content being captured, AI engine 100 may not need to receive and/or process the same content. When, however, a change in the content is detected (e.g., motion is detected within the frame of a capturing device), then the content may be transmitted. As will be understood by a person having ordinary skill in the art with various embodiments of the present disclosure, the transmission of content may be controlled on a per capturing device 025 and adjusted by the user 005 of the platform 001.

Still consistent with embodiments of the present disclosure, the content module 055 may provide uploaded content directly to AI engine 100. As will be described with reference to interface layer 015, the platform 001 may enable the user 005 to upload content to the AI engine 100. The content may be embodied in various forms (e.g., videos, images, and sensor data) and uploaded for the purposes of, but not limited to, training the AI engine 100 or detecting and tracking target objects by the AI engine 100.

In further embodiments, the content module 055 may receive content from a content source. The content source may be, for example, but not limited to, a data store 020 (e.g., local data store 020 or third-party data store 020) or a content stream 405 from a third-party platform. For example, as previously mentioned, the platform 001 may enable the user 005 to specify a content source with a URL. In turn, the content module 055 may be configured to access the URL and retrieve the content to be processed by AI engine 100. In some embodiments, the URL may point to a webpage or another source that contains one or more content streams 405. Still consistent with the present disclosure, the content module 055 may be configured to parse the data from the sources and inputs for one or more content streams 405 to be processed by the AI engine 100.

B. Recognition Module 065

A recognition module 065 may be responsible for the recognition and/or tracking of target objects within the content provided by a content module 055. The recognition module 065 may comprise a data store 020 from which to access target object data. The target object data may be used to compare against detected objects in the content to determine if an object within the content matches a target object.

In some embodiments, data store layer 020 may store the requisite data of target objects and detection parameters. Accordingly, recognition module 065 may be configured to retrieve or receive content from content module 055 and perform recognition based on a comparison of the content to object data retrieved from data store layer 020.

Further still, in some embodiments, the data store layer 020 may be provided by, for example, but not limited to, an external system of target object definitions. In this way, AI engine 100 performs processing on content received from an external system in order to recognize objects based on parameters provided by the same or another system.

AI engine 100 may be configured to trigger certain events upon the recognition of a target object by recognition module 065 (e.g., alerts). The events may be defined by settings specified by a user 005. In some embodiments, data store layer 020 may store the various event parameters configured by the user 005. As will be detailed below, the event parameters may be tied to different target object classifications and/or different zones and/or different events. One such example is to trigger a notification when a detected object matches a male moose present in zone 3 for over 5 minutes.

Figure 3:
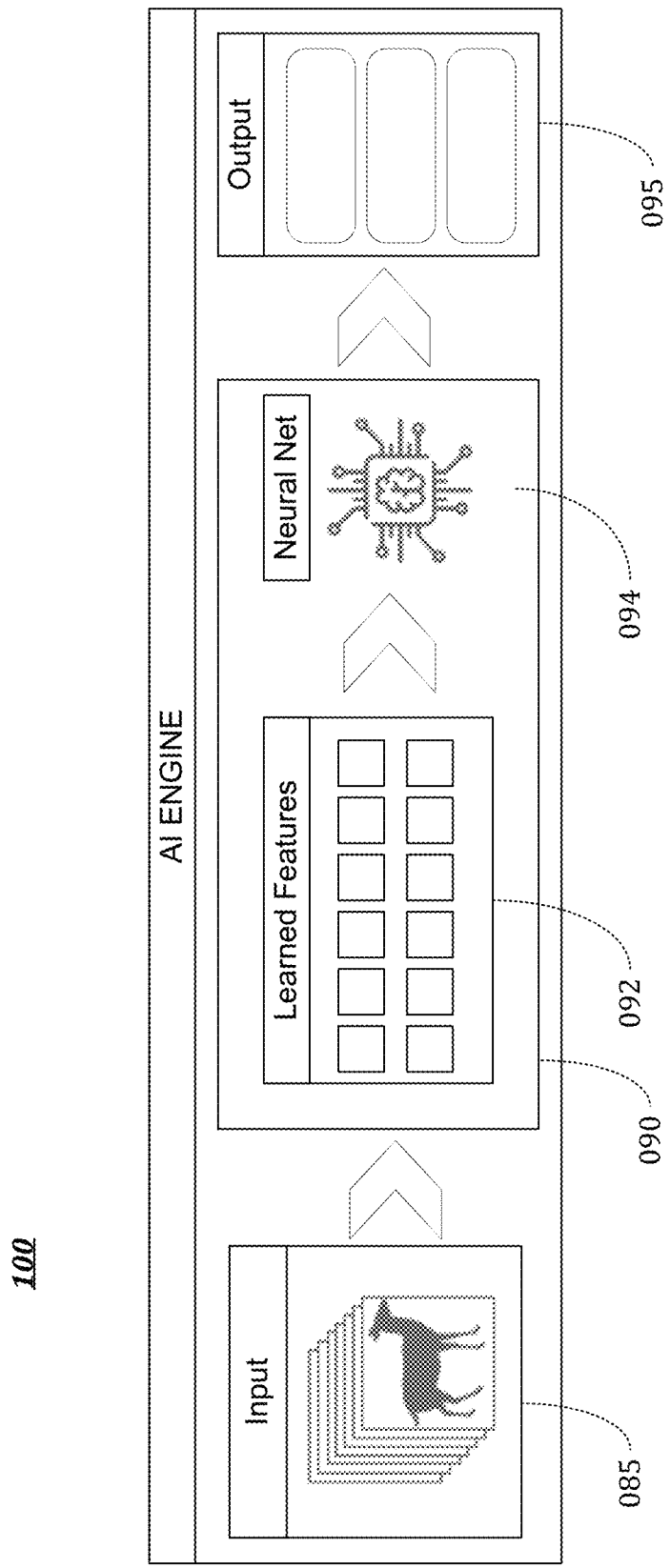
FIG. 3 illustrates a block diagram of an AI Engine consistent with some embodiments the present disclosure.

FIG. 3 illustrates one example of an AI engine 100 architecture for performing object recognition. In various embodiments, the architecture may be comprised of, but not limited to, an input stage 085, a recognition, tracking, and learning stage 090, and an output stage 095. Accordingly, AI engine 100 may receive or retrieve data from content module 055 during an input stage. The content 085 may then be processed in accordance to target object classifications associated with the content. The target object classifications may be based on, for example, but not limited to, the zone with which the content is associated. Associating content with a zone, and defining target objects to be tracked within a zone, will be detailed with reference to FIGS. 6 and 7, FIG. 11, FIG. 12, and FIG. 13.

Upon receiving the content 085, AI engine 100 may proceed to recognition stage 090. In this stage, AI engine 100 may employ the given content and process the content through, for example, a neural net 094 for detection of learned features 092 associated with the target objects. In this way, AI engine may, for example, compare the content with learned features 092 associated with the target object to determine if a target object is detected within the content. It should be noted that, while the input(s) may be provided to AI engine 100, neural net 094 and learned features 092 associated with target objects may be trained and processed internally. In another embodiment, the learned features may be retrieved by the AI engine 100 from a separate data store layer 020 provided by a separate system.

Consistent with embodiments of the present disclosure, the learned features 092 may be provided to the AI engine 100 via training methods and procedures as will be detailed with reference to FIGS. 4 and 5, FIG. 10, and FIGS. 17-21. In some embodiments, the acquired training data and learned features 092 may reside at, for example, data store layer 020. The features may be related to various target objects types for which AI engine 100 was trained, such as, but not limited to, animals, people, vehicles, and various other animate and inanimate objects.

For each target object type, AI engine 100 may be trained to detect different species, models, and features of each object. By way of non-limiting example, learned features 092 for an animal target object type may include a body type of an animal, a stance of an animal, a walking/running/galloping pattern of the animal, and horns of an animal.

In various embodiments, neural net 094 may be employed in the training of learned features 092, as well recognition stage 090 in the detection of learned features 092. As will be detailed below, the more training that AI engine 100 undergoes, the higher chance target objects may be detected, and with a higher confidence level of detection. Thus, the more users use AI engine 100, the more content AI engine 100 has with which to train, resulting in a greater list of target objects, types, and corresponding features. Furthermore, the more content the AI engine 100 processes, the more the AI engine 100 trains itself, making detection more accurate with higher confidence level.

Accordingly, neural net 094 may detect target objects within content received or retrieved in input stage 085. By way of non-limiting example, recognition stage 090 may perform AI based algorithms for analyzing detected objects within the content for behavioral patterns, motion patterns, visual cues, object curvatures, geo-locations, and various other parameters that may correspond to the learned features 092. In this way, target objects may be recognized within the content.

Having detected a target object, AI engine 100 may proceed to output stage 095. The output may be, for example, an alert sent to interface layer 015. In some embodiments, the output may be, for example, an output sent to analysis module 075 for ascertaining further characteristics of the detected target object.

C. Analysis Module 075

Consistent with some embodiments of the present disclosure, once a detected object has been classified to correspond to a target object, additional analysis may be performed. For example, the combination of features associated with the target object may be further analyzed to ascertain particular aspects of the detected target object. Those aspects may include, for example, but not be limited to, a health of an animal, an age of an animal, a gender of an animal, and a score for an animal.

As will be detailed below, these aspects of the target object may be used in determining whether or not to provide an alert. For example, if a designated zone is configured to only issue alerts when a target object, such as a deer, with a certain score (e.g., based on, for example, the animal's horns), then analysis module 075 may be employed to calculate a score for each target object detected that matches a deer target object and is within the designated zone.

Figure 14:
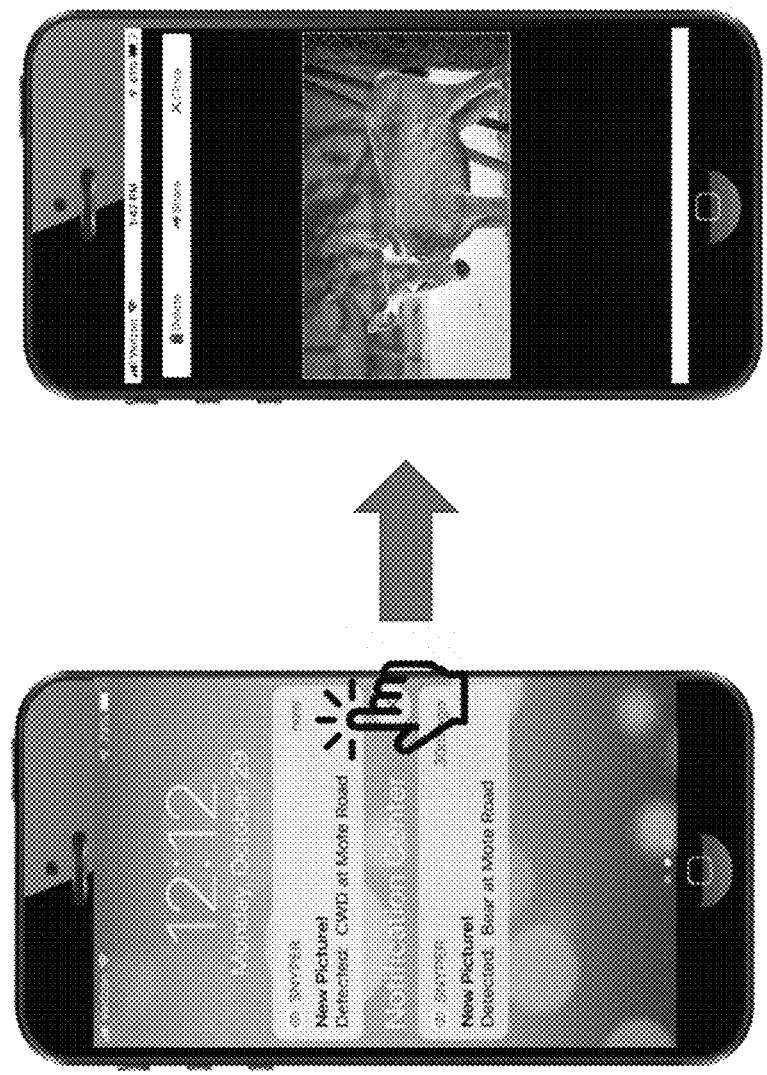
FIG. 14 illustrates screen captures of another user interface consistent with some embodiments the present disclosure.

Still consistent with the present disclosure, other aspects may include the detection of Chronic Wasting Disease (CWD). As CWD spreads in wild cervid populations, platform 001 may be employed as a broad remote surveillance system for detecting infected populations. Accordingly, AI engine may be trained with images and video footage of both healthy and CWD infected animals. In this way, AI engine 100 may determine the features inherent to deer infected with CWD. In turn, platform 001 may be configured to monitor vast amounts of content from a plurality of content sources (e.g., social media, SD cards, trail cameras, and other input data provided by content module 055). Upon detection, platform 001 may be configured to track infected animals and alert appropriate intervention teams to zones in which these infected animals were detected. FIG. 14 illustrates one example of a user interface for providing a CWD alert. The platform 001 may provide tracking of the infected animal, even across zones, to help intervention teams find the animal.

Furthermore, the analysis module 075 consistent with the present disclosure may detect any feature it was trained to detect, where the feature may be recognized by means of visual analysis, behavioral analysis, auditory analysis, or analysis of any other aspect where the data is provided about that aspect. While the examples provided herein may relate to animals, specifically cervid, it should be understood that the platform 001 is target object agnostic. Any animate or inanimate object may be detected, and any aspect of such object may be analyzed, provided that the platform 001 received training data for the object/aspect.

D. Interface Layer 015

Embodiments of the present disclosure may provide an interface layer 015 for end-users 005 and administrative users 005 of the platform 001. Interface layer 015 may be configured to allow a user 005 to interact with the platform and to initiate and perform certain actions, such as, but not limited to, configuration, monitoring, and receive alerts. Accordingly, any and all user interaction with platform 001 may employ an embodiment of the interface layer 015.

Interface layer 015 may provide a user interface (UI) in multiple embodiments and be implemented on any device such as, for example, but not limited to:
Capturing Device;
Streaming Device;
Mobile device; and
Any other computing device 900.

The UI may consist of components/modules which enable user 005 to, for example, configure, use, and manage capturing devices 025 for operation within platform 001. Moreover, the UI may enable a user to configure multiple aspects of platform 001, such as, but not limited to, zone designations, alert settings, and various other parameters operable in accordance to the embodiments of this disclosure.

An interface layer 015 may enable an end-user to control various aspects of platform 001. The interface layer 015 may interface directly with user 005, as will be detailed in section (III) of this present disclosure. The interface layer 015 may provide the user 005 with a multitude of functions, for example, but not limited to, access to feeds from capturing devices, upload capability, content source specifications, zone designations, target object specifications, alert parameters, training functionality, and various other settings and features.

An interface layer 015 may provide alerts, which may also be referred to as notifications. The alerts may be provided to a single user ^06, or a plurality of users 005, according to the aforementioned alert parameters. The interface layer 015 and alerts may provide user(s) 005 access to live content streams 405. In some embodiments, the content streams 405 may be processed by the AI engine 100 in real time. The AI engine 100 may also provide annotations superimposed over the content streams 405. The annotations may include, but are not limited to, markers over detected target objects, name of the detected target objects, confidence level of detection, current date/time/temperature, name of the zone, name associated with the current capturing device 025, and any other learned feature (as illustrated in FIGS. 17-21).

In another aspect, an interface layer 015 may enable an administrative user 005 to control various parameters of platform 001. The interface layer 015 may interface directly with administrative user 005, similar to end-user, to provide control over the platform 001, as will be detailed in section (III) of this present disclosure. Control of the platform 001 may include, but not be limited to, maintenance, security, upgrades, user management, data management, and various other system configurations and features. The interface layer 015 may be embodied in a graphical interface, command line interface, or any other UI to allow the user 005 to interact with the platform 001.

Furthermore, interface layer 015 may comprise an Application Programming Interface (API) module for system-to-system communication of input and output data into and out of the platform 001 and between various platform 001 components (e.g., AI engine 100). By employing an API module, platform 001 and/or various components therein (e.g., AI engine 100) may be integrated into external systems. For example, external systems may perform certain function calls and methods to send data into AI engine 100 as well as receive data from AI engine 100. In this way, the various embodiments disclosed with reference to AI engine 100 may be used modularly with other systems.

Still consistent with the present disclosure, in some embodiments, the API may allow automation of certain tasks which may otherwise require human interaction. The API allows a script/program to perform tasks exposed to a user 005 in an automated fashion. Applications communicating through the API can not only reduce the workload for a user 005 by means of automation and can also react faster than is possible for a human.

Furthermore, the API provides different ways of interaction with the platform 001, consistent with the present disclosure. This may enable third parties to develop their own interface layers 015, such as, but not limited to, a graphical user interface (GUI) for an iPhone or raspberry pi. In a similar fashion, the API allows integration with different smart systems, such as, but not limited to, smart home systems, and smart assistants, such as but not limited to, google home and Alexa.

The API may provide a plurality of embodiments consistent with the present disclosure, for example, but not limited to, a RESTful API interface and JSON. The data may be passed over a TCT/UDP direct communication, tunneled over SSH or VPN, or over any other networking topology.

The API can be accessed over a multitude of mediums, for example, but not limited to, fiber, direct terminal connection, and other wired and wireless interfaces.

Further still, the nodes accessing the API can be in any embodiment of a computing device 900, for example, but not limited to, a mobile device, a server, a raspberry pi, an embedded device, a fully programmable gate array (FPGA), a cloud service, a laptop, and a server. The instructions performing API calls can be in any form compatible with a computing device 900, such as, but not limited to, a script, a web application, a compiled application, a macro, and software as a service (SaaS) cloud service, and machine code.

E. Data Store Layer

Consistent with embodiments of the present disclosure, platform 001 may store, for example, but not limited to, user profiles, zone designations, and target object profiles. These stored elements, as well as others, may all be accessible to AI engine 100 via a data store 020.

User data may include, for example, but not be limited to, a user name, email, logon credentials, device IDs, and other personally identifiable and non-personally identifiable data. In some embodiments, the user data may be associated with target object classifications. In this way, each user 005 may have a set of target objects trained to the user's 005 specifications. In additional embodiments, the object profiles may be stored by data store 020 and accessible to all platform users 005.

Zone designations may include, but not be limited to, various zones and zone parameters such as, but not limited to, device IDs, device coordinates, geo-fences, alert parameters, and target objects to be monitored within the zones. In some embodiments, the zone designations may be stored by data store 020 and accessible to all platform users 005.

III. Platform Operation

Embodiments of the present disclosure provide a hardware and software platform 001 operative by a set of methods and computer-readable storage comprising instructions configured to operate the aforementioned modules and computing elements in accordance with the methods. The following depicts an example of a method of a plurality of methods that may be performed by at least one of the aforementioned modules. Various hardware components may be used at the various stages of operations disclosed with reference to each module.

For example, although methods may be described to be performed by a single computing device 900, it should be understood that, in some embodiments, different operations may be performed by different networked computing devices 900 in operative communication. For example, cloud service and/or plurality of computing devices 900 may be employed in the performance of some or all of the stages disclosed with regard to the methods. Similarly, capturing device 025 may be employed in the performance of some or all of the stages of the methods. As such, capturing device 025 may comprise at least a portion of the architectural components comprising the computing device 900.

Furthermore, even though the stages of the following example method are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed below. Moreover, various stages may be added or removed from the without altering or deterring from the fundamental scope of the depicted methods and systems disclosed herein.

Consistent with embodiments of the present disclosure, a method may be performed by at least one of the aforementioned modules. The method may be embodied as, for example, but not limited to, computer instructions, which when executed, perform the method. The method may comprise the following stages:

receiving a content stream from a content source, the content source comprising at least one of the following:
 a capturing device, and
 a uniform resource locator;
establishing at least one target object to detect within the content stream, wherein establishing the at least one target object to detect comprises:
 retrieving at least one target object profile from a database of learned target object profiles, wherein the at least one learned target object profile is associated with the at least one target object to detect, and wherein the database of learned target object profiles is associated with target objects that have been trained for detection within at least one frame of the content stream, and
 analyzing at least one frame associated with the content stream, wherein analyzing the at least one frame comprises:
detecting, employing a neural net, the at least one target object within the at least one frame by matching aspects of the at least one frame to aspects of the at least one learned target object profile;
establishing at least one parameter for communicating target object detection related data, wherein the at least one parameter specifies the following:
 at least one aspect of the at least one detected target object, and
 at least one aspect of the content source; and
 communicating the target object detection related data when the at least one parameter is met, wherein communicating the target object detection related data comprises at least one of the following:

transmitting the at least one frame along with annotations associated with the detected at least one target object; and transmitting a notification comprising the target object detection related data.

Still consistent with embodiments of the present disclosure, an AI Engine may be provided. The AI engine may comprise, but not be limited to, for example, a content module, a recognition module, and an analysis module.

The content module may be configured to receive a content stream from at least one content source.

The recognition module may be configured to:
match aspects of the content stream to at least one learned target object profile from a database of learned target object profiles to detect target objects within the content, and upon a determination that at least one of the detected target objects corresponds to the at least one learned target object profile:
classify the at least one detected target object based on the at least one learned target object profile, and
update the at least one learned target object profile with at least one aspect of the at least one detected target object.

The analysis module may be configured to:
process the at least one detected target object through a neural net for a detection of learned features associated with the at least one detected target object, wherein the learned features are specified by the at least one learned target object profile associated with the at least one detected target object,
determine, based on the process, the following:
a gender of the at least one detected target object,
an age of the at least one detected target object,
a health of the at least one detected target object, and
a score for the at least one detected target object, and
update the learned target object profile with the detected learned features.

In yet further embodiments of the present disclosure, a system comprising at least one capturing device, at least one end-user device, and an AI engine may be provided.

The least one capturing device may be configured to:
register with an AI engine,
capture at least one of the following:
visual data, and
audio data,
digitize the captured data, and
transmit the digitized data as at least one content stream to the AI engine.

The at least one end-user device may be configured to:
configure the at least one capturing device to be in operative communication with the AI engine,
define at least one zone, wherein the at least one end-user device being configured to define the at least one zone comprises the at least one end-user device being configured to:
specify at least one content source for association with the at least one zone, and
specify the at least one content stream associated with the at least one content source, the specified at least one content stream to be processed by the AI engine for the at least one zone,
specify at least one zone parameter from a plurality of zone parameters for the at least one zone, wherein the zone parameters comprise:
a plurality of selectable target object designations for detection within the at least one zone, the target object designations being associated with a plurality of learned target object profiles trained by the AI engine,
specify at least one alert parameter from a plurality of alert parameters for the at least one zone, wherein the alert parameters comprise:
triggers for an issuance of an alert,
recipients that receive the alert,
actions to be performed when an alert is triggered, and
restrictions on issuing the alert,
receive the alert from the AI engine, and
display the detected target object related data associated with the alert, wherein the detected target object related data comprises at least one frame from the at least one content stream.

The AI engine of the system may comprise a content module, a recognition module, an analysis module, and an interface layer.

The content module may be configured to receive the content stream from the at least one capturing device.

The recognition module may be configured to:
match aspects of the content stream to at least one learned target object profile in a database of the plurality of learned target object profiles trained by the AI engine to detect target objects within the content, and upon a determination that at least one of the detected target objects corresponds to the at least one learned target object profile:
classify the at least one detected target object based on the at least one learned target object profile, and
update the at least one learned target object profile with at least one aspect of the at least one detected target object;
an analysis module configured to:
process the at least one detected target object through a neural net for a detection of learned features associated with the at least one detected target object, wherein the learned features are specified by the at least one learned target object profile associated with the at least one detected target object,
determine, based on the process, the following attributes of the at least one detected target object:
a gender of the at least one detected target object,
an age of the at least one detected target object,
a health of the at least one detected target object, and
a score for the at least one detected target object,
update the learned target object profile with the detected learned features, and
determine whether the at least one detected target object corresponds to at least one of the target object designations associated with the zone specified at the end-user device, and
determine whether the attributes associated with the at least one detected object correspond to the triggers for the issuance of the alert.

The interface layer may be configured to:
communicate the detected target object data to the at least one end-user device, wherein the detected target object related data comprises at least one of the following:
at least one frame along with annotations associated with the detected at least one target object, and
a push notification to the at least one end-user device.

A. AI Training

Figure 4:
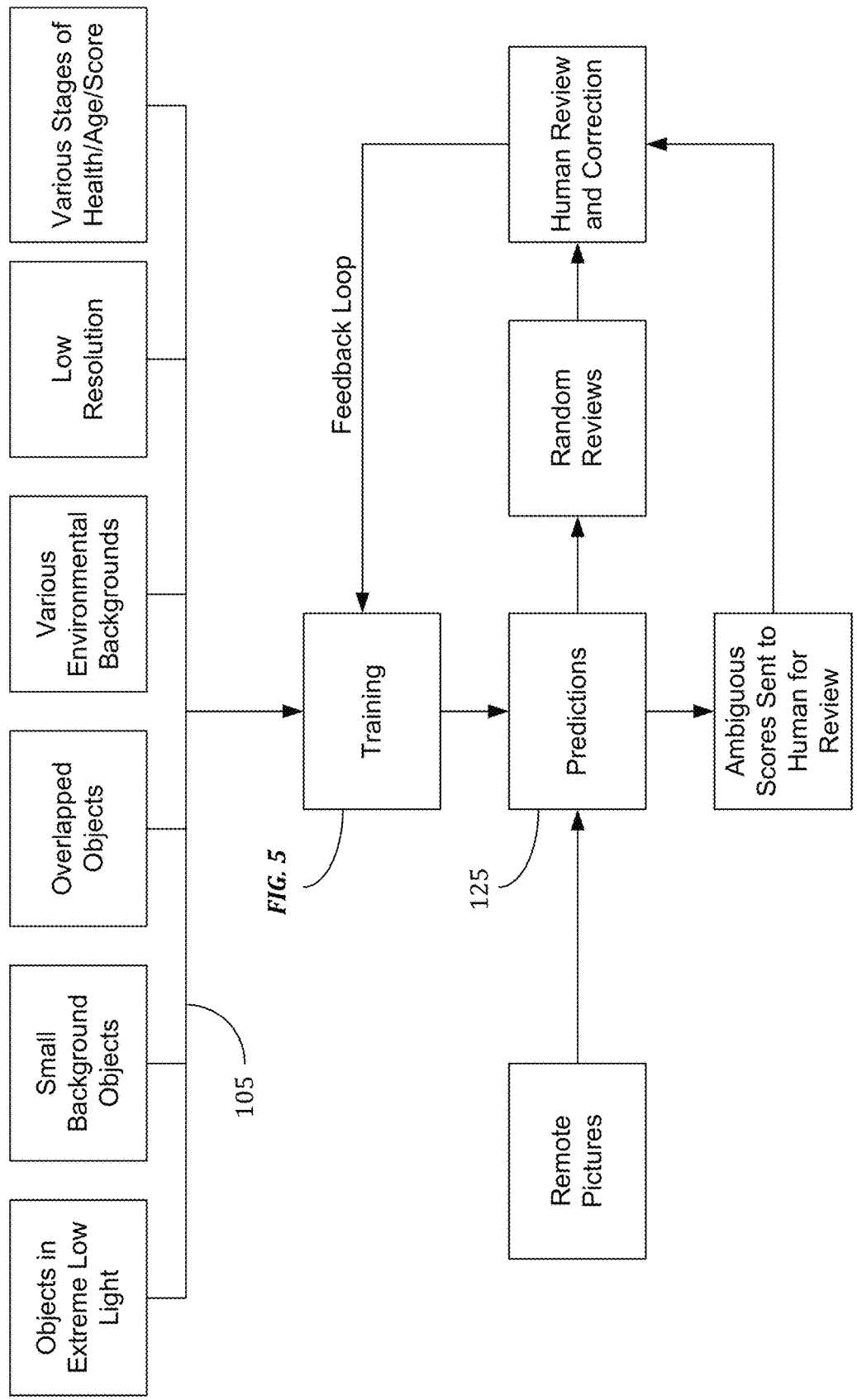
FIG. 4 is a flow chart of a method for AI training consistent with some embodiments the present disclosure.
Figure 5:
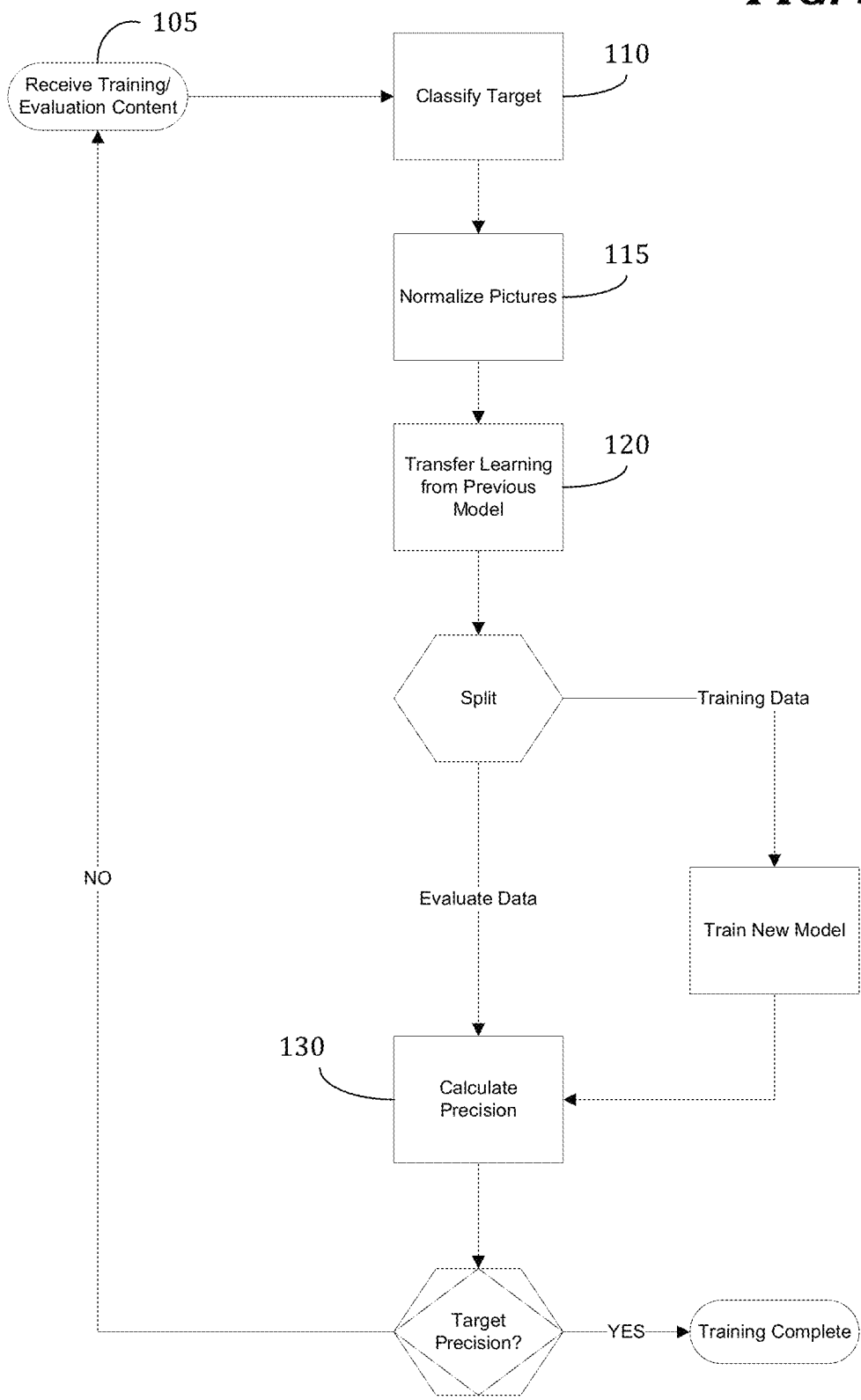
FIG. 5 is a flow chart of another method for AI training consistent with some embodiments the present disclosure.
Figures 6, 7:
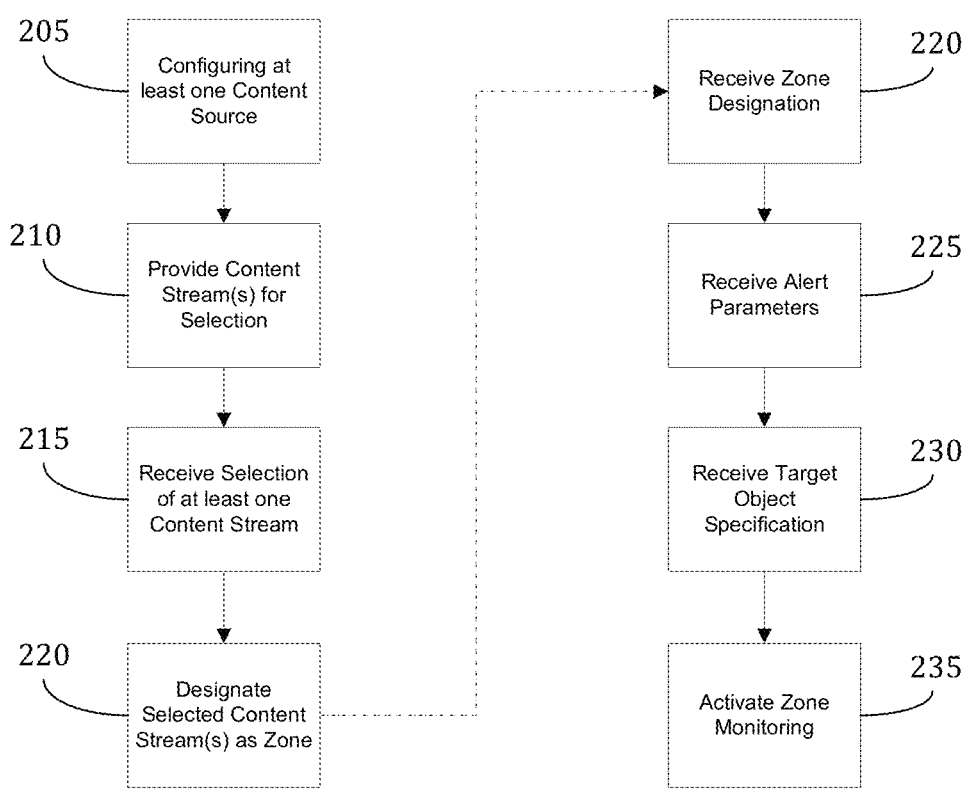
FIG. 6 is a flow chart of a method for associating a content source with a zone consistent with some embodiments the present disclosure.
FIG. 7 is a flow chart of a method for defining parameters with a zone consistent with some embodiments the present disclosure.

AI Engine 100 may be trained in accordance to, but not limited to, the methods illustrated in FIG. 4 and FIG. 5. AI Engine 100 may be trained to recognize various target objects and establish learned features 092 for various target objects. Training methods may be required for the AI Engine 100 to determine which aspects of an object to assess in objects detected within content supplied by content module 055. Accordingly, each trained target object model may be embodied as a target object profile in data layer 020. In some embodiments, the trained models can then be used platform wide, for all users, as a universal target object model.

Training enables AI Engine 100 to, among many functions, properly classify input(s) (e.g. content received from content module 055). Furthermore, training methods may be required to ascertain which outputs are useful for the user 005, and when to provide them. Training can be initiated by the user(s), as well as triggered automatically by the system itself. Although embodiments of the present disclosure refer to visual content, similar methods and systems may be employed for the purposes of training other content types, such as, but not limited to, ultrasonic/audio content, infrared (IR) content, ultraviolet (UV) content and content comprised of magnetic readings.

1) Receiving Training Content 105

In a first stage, a training method may begin by receiving content for training purposes. Content may be received from content module 055 during a training input stage 085. In some embodiments consistent with the present disclosure, the recognition state 090 may trigger a training method and provide that training method content into the input stage 085.
  a. The received training content may be received from a capturing device 025, such as, but not limited to:
    i. a surveillance device;
    ii. a professional device;
    iii. handheld device;
    iv. wearable device;
    v. a remote device, such as, but not limited to:
      a. cellular trail camera, such as, but not limited to:
        i. traditional cellular camera and
        ii. a Commander 4G LTE cellular camera, and
      b. Cellular motion sensor
    vi. intermediary platform such as, but not limited to
      1. computing device 900, and
      2. cloud computing device.

The training content may be selected to be the same or similar to what AI engine 100 is likely to find during recognition stage 090. For example, if a user 005 elects to train AI engine 100 to detect a deer, training content will consist of pictures of deer. Accordingly, training content may be curated for the specific training user 005 desires to achieve. In some embodiments, AI engine 100 may filter the content to remove any unwanted objects or artifacts, or otherwise enhance quality, whether still or in motion, in order to better detect the target objects selected by user 005 for training.
  b. The training content may contain images in different conditions, such as, but not limited to:
    i. Varying Quality AI engine 100 may encounter content of various quality due to equipment and condition variations, such as, for example, but not limited to:
  1. High Resolution (FIG. 17);
  2. Low Resolution (FIG. 18);
  3. Large Objects (FIG. 17);
  4. Small Objects (FIG. 020);
  5. Color Objects (FIG. 17); and
  6. Monochrome/Infrared (FIG. 18-21).
    ii. Varying Environmental Backgrounds AI engine 100 may encounter different weather conditions that must be accounted for, such as, but not limited to:

1. Foggy (FIG. 19);
  2. Rainy;
  3. Snowy;
  4. Day (FIG. 17);
  5. Night (FIG. 19-21);
  6. Indoor; and
  7. Outdoor (FIG. 17-21).
    iii. Varying Layouts The training images may comprise variations to the positioning and layout of the target objects within a frame. In this way, AI engine 100 may learn how to identify objects in different positions and layouts within an environment, such as, but not limited to:
  1. Small Background Objects (FIG. 020);
  2. Overlapped Objects (FIG. 21);
  3. Large foreground objects (FIG. 17);
  4. Multiple Objects (FIG. 020);
  5. Single Objects (FIGS. 17-18);
  6. Partially out of frame (FIG. 18);
  7. Doppler effect.
    iv. Varying Parameters The training images may depict target objects with varying parameters. In this way, the AI engine ^112 may learn the different parameters associated with the target objects, such as, for example, but not limited to:
  1. Age;
  2. Sex;
  3. Size;
  4. Score;
  5. Disease;
  7. Color;
  8. Logo; and
  9. Behavior.

2) Classifying Training Content 110

Once the training images are received, AI engine 100 may be trained to understand a context in which it will be training for target object detection. Accordingly, in some embodiments, content classifications provided by user 005 may be provided in furtherance of this stage. The classifications may be provided along with the training data by way of interface layer 015. In various embodiments, the classification data may be integrated with the training data as, for example, but not limited to, metadata. Content classification may inform the AI engine 100 as what is represented in each image.
  a. Content may be classified by class, such as, but not limited to:
    i. Type of animate object, such as, but not limited to:
      1. Type of Animal (such as protected animals), such as, but not limited to:
        a. Deer (FIG. 17-21);
        b. Human;
        c. Pig;
        d. Fish; and
        e. Bird
      2. Type of plant such as, for example, but not limited to:
        a. Rose;
        b. Oak
        c. Tree; and
        d. Flower.
    ii. Type of inanimate object such as, but not limited to:
      1. Type of vehicle;
      2. Type of drone; and
      3. Type of robot.

Furthermore, AI engine 100 may be trained to detect certain characteristics of target objects in order to, for example, ascertain additional aspects of detected objects (e.g., a particular sub-grouping of the target object).
  b. Content classifications may be refined by, such as, but not limited to:
    i. Gender;
    ii. Race;
    iii. Age;
    iv. Health; and
    v. Score.
  c. Content may be further classified by features of Target Objects, such as, but not limited to:
    i. Tattoos;
    ii. Birthmarks;
    iii. Tags;
    iv. License Plate; and
    v. Other Markings.
  d. Content may also be classified by a symbol, image, or textual content demarking an origin, such as, but not limited to:
    i. UPS;
    ii. Fed-Ex;
    iii. Ford;
    iv. Kia;
    v. Apple;
    vi. leopard print;
    vii. tessellation;
    viii. fractal;
    ix. Calvin Klein; and
    x. Hennessy.
  e. Content may be classified by Identity such as, but not limited to:
    i. John Doe;
    ii. Jane Smith;
    iii. Donald Trump;
    iv. Next door neighbor;
    v. Mail man; and
    vi. Neighbor's cat.

The aforementioned examples are diversified to indicate, in a non-limiting way, the variety of target objects that AI engine 100 can be trained to detect. Furthermore, as will be detailed below, platform 001 may be programmed with certain rules for including or excluding certain target objects when triggering outputs (e.g., alerts). For example, user 005 may wish to be alerted when a person approaches their front door but would like to exclude alerts if that person is, for example, a mail man.

3) Normalizing Training Content 115

In some embodiments, due to varying factors that may be present in the training content (e.g., environmental conditions), AI engine 100 may normalize the training content. Normalization may be performed in order to minimize the impact of the varying factors. Normalization may be accomplished using various techniques, such as, but not limited to:
  a. Red eye reduction;
  b. Brightness normalization;
  c. Contrast normalization;
  d. Hue adjustment; and
  e. Noise reduction.

In various embodiments, AI engine 100 may undergo the stage of identifying and extracting objects within the training content (e.g., object detection). For example, AI engine 100 may be provided with training content that comprises one or more objects in one or more configurations. Once the objects are detected within the content, a determination that the objects are to be classified as indicated may be made.

4) Transferring Learning from the Previous Model 120

In various embodiments of the present disclosure, AI engine 100 may employ a baseline from which to start content evaluation. For this baseline, a previously configured evaluation model may be used. The previous model may be retrieved from, for example, data layer 020. In some embodiments, a previous model may not be employed on the very first training pass.

5) Making Evaluation Predictions 125

At a making evaluation predictions 125 stage, AI engine 100 may be configured to process the training data. Professing the data may be used to, for example, train the AI engine 100. During certain iterations, AI engine 100 may be configured to evaluate the AI engine's 100 precision. Here, rather than processing training data, AI engine 100 may process evaluation data to evaluate the performance of the trained model. Accordingly, AI engine 100 may be configured to make predictions and test the prediction's accuracy.

a. Embodiments of the present disclosure may use "live" data to train and evaluate the model used by AI engine 100.

In this instance, AI engine 100 may receive live data from content module 055. Accordingly, AI engine 100 may perform one or more of the following operations: receive the content, normalize it, and make predictions based on a current or previous model. Furthermore, in one aspect, AI engine 100 may use the content to train a new model (e.g., an improved model) should the content be used as training data or evaluate content via the current or previous training model. In turn, the improved model may be used for evaluation on the next pass, if required.

b. Embodiments of the present disclosure may use prerecorded and/or rendered training data to train and evaluate the model used by AI engine 100.

In this instance, the AI engine 100 may be trained with any content, such as, but not limited to, previously captured content. Herein, since the content is not streamed to AI engine 100 as a live feed, AI engine 100 may not require training in real time. This may provide for additional training opportunities and, therefore, lead to more effective training. This may also allow training on less powerful equipment or use less resources to train.

In some embodiments, AI engine 100 may randomly choose which predictions to send for evaluation by an external source. The external source may be, for example, a human (e.g., sent via interface layer 015) or another trained model (e.g., sent via interface layer 015). In turn, the external source may validate or invalidate the predictions received from the AI engine 100.

6) Calculating the Precision of the Evaluation 130

Consistent with embodiments of the present disclosure, the AI engine 100 may proceed to a subsequent stage in training to calculate how accurately it can evaluate objects within the content to identify the objects' correct classification. Referring back, AI engine 100 may be provided with training content that comprises one or more objects in one or more configurations. Once the objects are detected within the content, a determination that the objects are to be classified as indicated may be made. The precision of this determination may be calculated. The precision may be determined in combination between human verification and evaluation data. In some embodiments consistent with the present disclosure, a percentage of the verified training data may be reserved for testing the evaluation accuracy of the AI engine 100.

In some embodiments, prior to training, a user 005 may set target precision, or minimum accuracy of the AI engine 100. For example, the AI engine 100 may be unable to determine its precision without ambiguity. At this stage, an evaluation may be made if the desired accuracy has been reached. For example, AI engine 100 may provide the prediction results for evaluation by an external source. The external source may be, for example, a human (e.g., sent via interface layer 015) or another trained model (e.g., sent via interface layer 015). In turn, the external source may validate or invalidate the predictions received from AI engine 100.

B. Zone Designation

Figure 13:
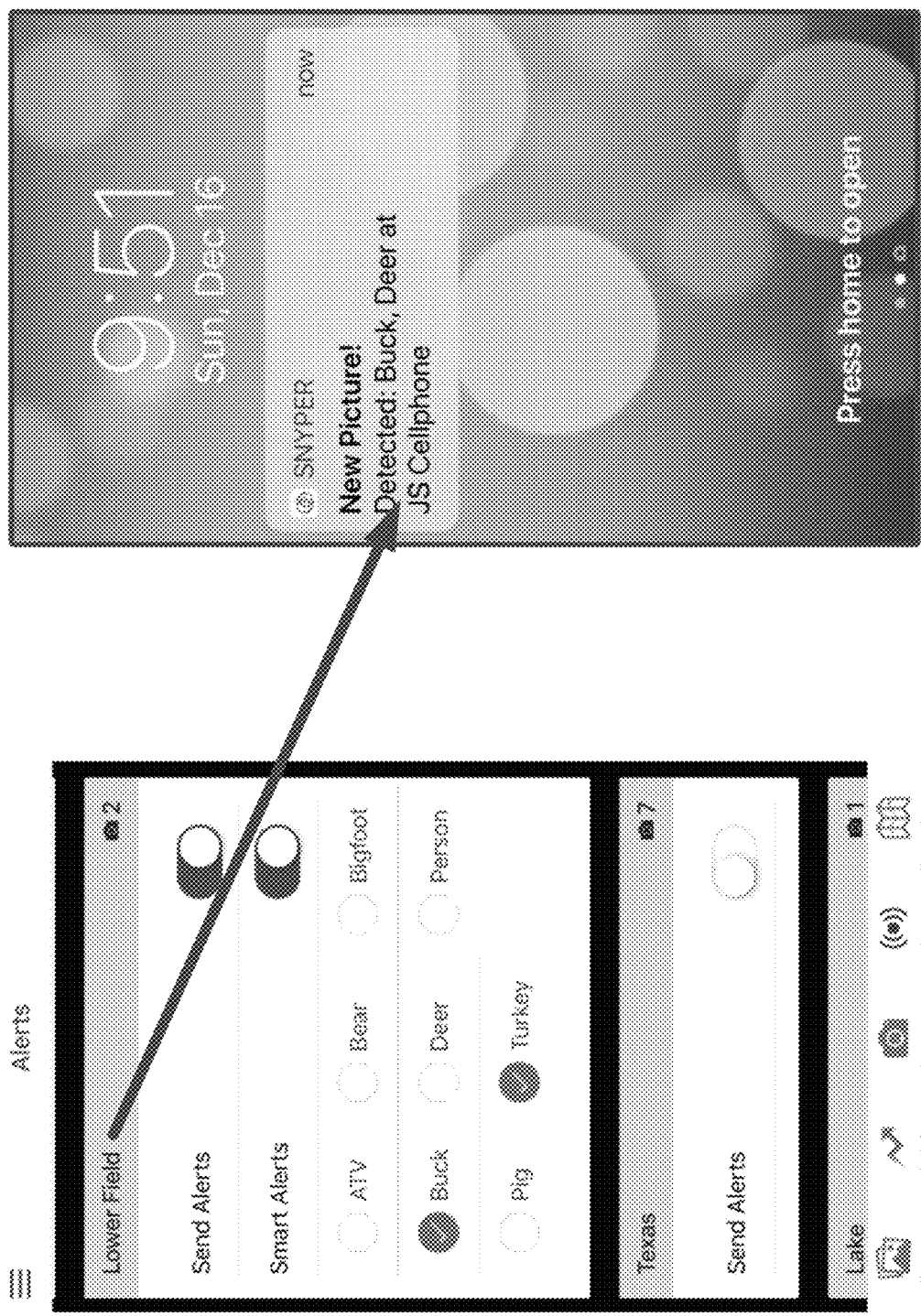
FIG. 13 illustrates screen captures of a user interface consistent with some embodiments the present disclosure.

FIG. 13 illustrates one example of a method for establishing a content source for a zone designation. Although zoning may not be necessary in platform 001, it may help a user 005 organize various content sources. Accordingly, embodiments of the present disclosure may provide zone designations to enable the assignment of a plurality of content streams 405 to the same detection, alert parameters, location, and/or any other grouping a user 005 may choose. Nevertheless, in some embodiments, the tracking and alert parameters associated with one or more content sources within a zone may be customized to differ from other parameters in the same zone. Zone designation may be performed as follows:

1. Configuring at Least One Capturing Device 205

In an initial stage, a user 005 may register a content source with platform 001. This stage may be performed at the content source itself. In such instance, the content source is may be in operative communication with platform 001, via for example, an API module. Accordingly, in some embodiments, the content source may be adapted with interface layer 015. Interface layer 015 may enable a user 005 to connect content source to platform 001 such that it may be operative with AI engine 100. This process may be referred to as pairing, registration, or configuration, and may be performed, as mentioned above, through an intermediary device.

Consistent with embodiments of the present disclosure, the content source might not be owned or operated by the user 005. Rather, the user 005 may be enabled to select third party content sources, such as, but not limited to:
 a. Public cameras; and
 b. Security cameras.

Accordingly, content sources need not be traditional capturing devices. Rather, content platforms may be employed, such as, for example, but not limited by:
 a. Social media platform and/or feed;
 b. YouTube video;
 c. Hunter Submission;
 d. Solid state media, such as SD Card;
 e. Optical media, such as DVD; and
 f. A website.

Furthermore, each source may be designated with certain labels. The labels may correspond to, for example, but not be limited by, a name, a source location, a device type, and various other parameters.

2. Providing and Receiving Content Stream 405 Selection 210 and 215

Figure 11:
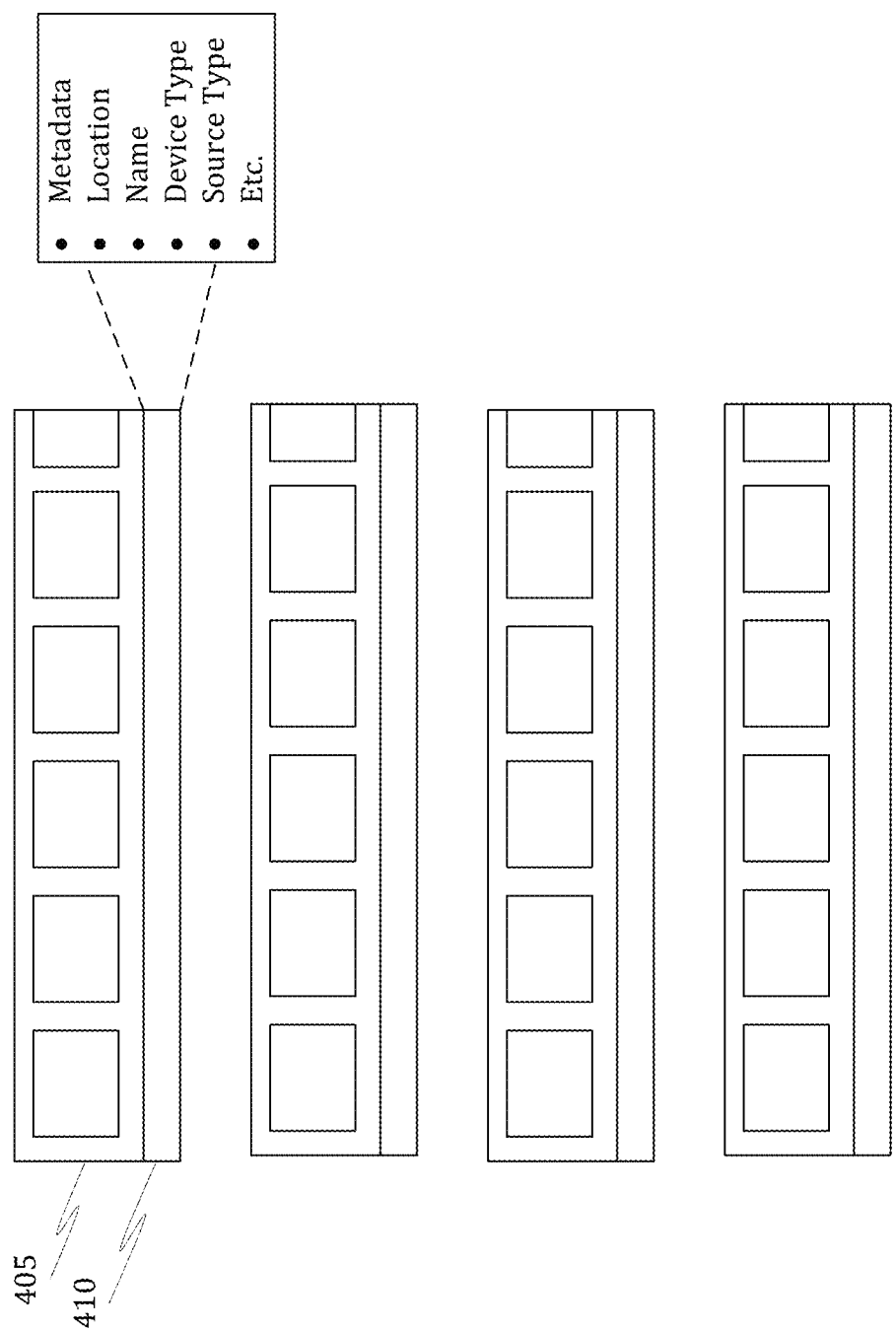
FIG. 11 illustrates a block diagram of a zone consistent with some embodiments the present disclosure.

Having configured one or more contents sources, platform 001 may then be enabled to access the content associated with each content source. FIG. 11 illustrates one example of a UI that may be provided by interface layer 015. The content may be, for example, but not limit to, a content stream 405 received from a configured capturing device 025. Metadata 410 associated with content stream 405 may be provided in some embodiments. In other embodiments, the content may be comprised of a data stream received from a content source, but not limited to, such as a live feed made accessible online. Whatever it's form, the content may be provided to a user 005 for selection and further configuration. Next, a user 005 may select one or more content streams 405 for designation as a zone.

3. Designated Content Streams as a Zone 220

Selected content streams 405 may be designated as a detection and alert zone. It should be noted that, while a selection of content streams 405 was used to designate a detection and alert zone, a designation of the zone is possible with or without content stream 405 selection. For example, in some embodiments, the designation may be based on a selection of capturing devices. In yet further embodiments, a zone may be, for example, an empty container and, subsequent to the establishment of a zone, content sources may be attributed to the zone.

Each designated zone may be associated with, for example, but not limited to, a storage location in data layer 020. The zone may be private or public. Furthermore, one or more users 005 may be enabled to attribute their content source to a zone, thereby adding a number of content sources being processed for target object detection and/or tracking in a zone. In instances where more than one user 005 has access to a zone, one or more administrative users 005 may be designated to regulate the roles and permissions associated with the zone.

Accordingly, a zone may be a group of one or more content sources. The content sources may be obtained from, for example, the content module 055. For example, the content source may be one or more capturing devices 025 positioned throughout a particular geographical location. Here, each zone may represent a physical location associated with the capturing devices 025. In some embodiments, the capturing devices 025 may provide location information associated with its position. In turn, on or more capturing devices 025 within a proximity to each other may be designated to be within the same zone.

Still consistent with embodiments of the present disclosure, zones need not be associated with a location. For example, zones can be groupings of content sources that are to be tracked for the same target objects. However, the groupings may refer to geo-zones, although a physical location is not tracked. For example, zones may be grouped by, but not be limited to:
 Living Room
 Outdoor Sector 1
 Indoor Sector 1
 Backyard
 Driveway
 Office Building
 Shed
 Grand Canyon The aforementioned examples of zones may be associated with content sources in accordance to the method of FIG. 13. By way of non-limiting example, a first plurality of content capturing devices 025 may be set up around a first geographical region, and a second plurality of content capturing devices 025 may be set up around a second geographical region. In some embodiments, platform 001 may suggest grouping the capturing devices 025 based on a location indication received by each of the capturing devices 025. In further embodiments, platform 001 may enable a user 005 to select capturing devices 025 and designate them to be grouped within the zone.

Each zone may be designated with certain labels. The labels may correspond to, for example, but not be limited by, a name, a source location, a device type, storage location, and various other parameters. Moreover, each content source may also contain identifying labels.

Consistent with embodiments of the present disclosure, platform 001 may be operative to perform the following operations: generating at least one content stream 405; capturing data associated with the at least one content stream 405; aggregating the data as metadata to the at least one content stream 405; transmitting the at least one content stream 405 and the associated metadata; receiving a plurality of content streams 405 and the associated metadata; organizing the plurality of content streams 405, wherein organizing the plurality of content streams 405 comprises: establishing a multiple stream container 420 for grouping captured content streams of the plurality of content streams 405 based on metadata associated with the captured content streams 405, wherein the multiple stream container 420 is established subsequent to receiving content for the multiple stream container 420, wherein establishing the multiple stream container 420 comprises: i) receiving a specification of parameters for content streams 405 to be grouped into the multiple stream container 420, wherein the parameters are configured to correspond to data points within the metadata associated with the content streams 405, and wherein receiving the specification of the parameters further comprises receiving descriptive header data associated with the criteria, the descriptive header data being used to display labels associated with the multiple content streams 405.

Figure 12:
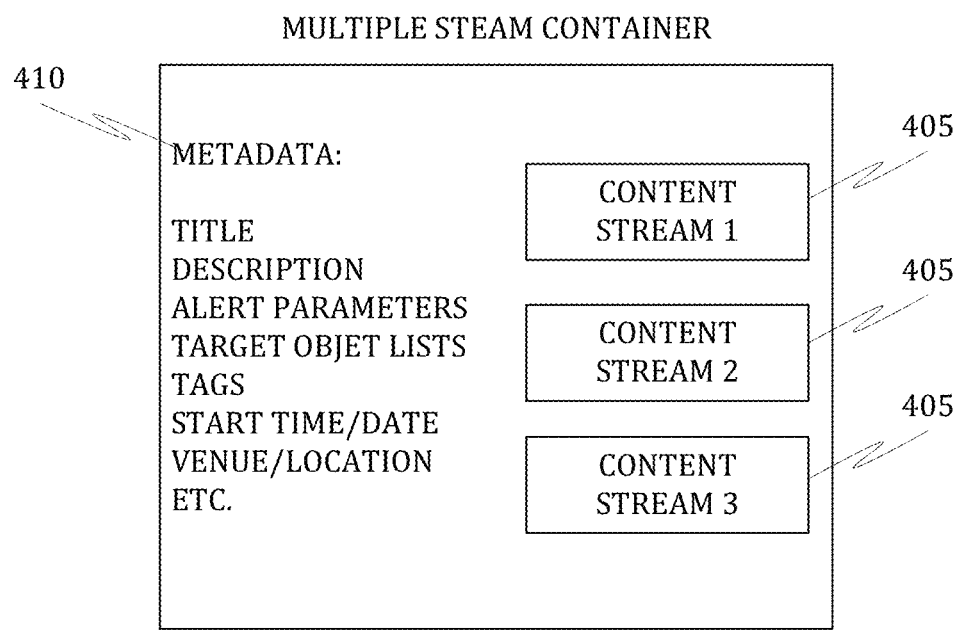
FIG. 12 illustrates a block diagram of a plurality of zones consistent with some embodiments the present disclosure.

FIG. 12 illustrates how one or more content streams 405 may be associated with a zone. Grouping content streams 405 into a container 420 may be based on, at least in part, parameters defined for the multiple stream parameter, and metadata data associated with the content streams 405. The content streams 405 may be labeled, wherein labeling the content within the multiple stream container 420 comprises, but is not limited to, at least one of the following: identifiers associated with the content source; a location of capture associated with each content source, such as, but not limited to, a venue, place, event; a time of capture associated with each content stream 405, such as, but not limited to, a date, start-time, end-time, duration; and orientation data associated with each content stream 405. In some embodiments, labeling the content streams 405 further comprises labeling the multiple stream container 420 based on parameters and descriptive header associated with the multiple stream container 420. The labeled content streams 405 may then be indexed, searched, and discovered by other platform users.

C. Target Object Detection and Alert Parameters

Content obtained from content sources may be processed by the AI engine 100 for target object detection. Although zoning is not necessary on the platform 001, it may help a user 005 organize various content sources with the same target object detection and alert parameters, or the same geographical location. Accordingly, embodiments of the present disclosure may provide zone designations to enable the assignment of a plurality of content streams 405 to the same detection and alert parameters. Nevertheless, in some embodiments, the tracking and alert parameters associated with one or more content sources within a zone may be customized to differ from other parameters in the same zone.

1. Receiving Zone Designation 220

Detection and alert parameters may be received via an interface layer 015. FIG. 13 illustrates one example of a UI for specifying alert parameters. Accordingly, in some embodiments, aforementioned parameters may be defined upon a selection of a zone to which they may be associated with. Thus, a user 005 may select which zone(s), to configure one or more alert parameters associated with the aforementioned zone(s).

2. Specifying Alert Parameters 225

An interface layer 015 consistent with embodiments of the present disclosure may enable a user 005 to configure parameters that trigger an alert for one or more defined zones. As target objects are detected, the platform facilitates real-time transmission of intelligent alerts. Alerts can be transmitted to and received on any computing device 900 such as, but not limited to, a mobile device, laptop, desktop, and any other computing device 900.

In some embodiments, the computing device 900 that receives the alerts may also be the content capturing device 025 that sends the content for analysis to the AI engine 100. For example, a user 005 may have a wearable device with content capturing means. The captured content may be analyzed for any desired target objects specified by the user 005. In turn, when a desired target object is detected within the content stream 405, the wearable device may receive the corresponding alert as defined by the aforementioned user 005. Furthermore, alerts can be transmitted and received over any medium, such as, but not limited to e-mail, SMS, website and mobile device push notifications.

In various embodiments, an API module may be employed to push notifications to external systems. FIG. 14 illustrates on example of alert notifications. The notifications may be custom notifications with user-defined messaging, that may include relevant content, a confidence score, and various other parameters (e.g., the aforementioned content source metadata). Furthermore, the notifications may comprise a live feed of the detected target object that triggered the alert as it is being tracked through the zone. By way of non-limiting example, notifications may report different alert parameters, such as, for example, but not limited to:
   a. Target Object detected
      1. Frequency of the detected Target Object
   b. Time and duration detected
   c. Location detected
   d. Sensor (or Source) detected
   e. Action Triggered (if any)

Parameters that may trigger an alert to be sent may comprise, for example, but not limited to, the following:
   a. Monitoring Time Period
      Example Command: Limit Alerts to triggers received within or outside a specified time period.
   b. Group size
      Example Command: Trigger an alert if the number of detected targets is greater than, equal to and/or less than specified.
   c. Score
      Example Command: Trigger an alert if the score of the detected target is greater than, less than, and/or equal to the score specified.
   d. Age
      Example Command: Trigger an alert if the age of the target is greater than, less than, and/or equal to the age specified.
   e. Gender
      Example Command: Trigger an alert if the gender of the detected target matches the gender specified.
   f. Disease
      Example Command: Trigger an alert if the detected target is found to carry or be free from a specified disease.
   g. Geo location
      Example Command: Trigger an alert if the target enters and/or leaves a specified location.

h. Content source

Example Command: Trigger an alert based on the content source type or other content source related parameters.

i. Confidence level

Example Command: Trigger an alert if the confidence level is greater than, less than, and/or equal to the confidence level specified, wherein, the confidence threshold can be adjusted separately for every target that triggers an alert.

f. Perform Action

Example Command: Trigger an action to be performed, for example, but not limited to:

i. Send Target Object data to the Training Method, ii. Upload picture to cloud storage, and iii. Notify Law Enforcement g. Recipient/Medium Example Command: Each alert parameter can trigger an alert to be sent to plurality of recipients over a plurality of medium(s).

Consistent with embodiments of the present disclosure, alert parameters may define destinations for the alerts. For example, a first type of alert may be transmitted to a first user 005, a second type of alert may be transmitted to a second user 005, and a third type of alert may be transmitted to both first and second users 005. The alert destinations may be based on any alert parameter, and the detected target object. Accordingly, alerts may be customized based on target object types as well as other alert parameters (e.g., content source).

In some embodiments, the interface layer 015 may provide a user 005 with operative controls associated with the content source, the zone in which the content source is located, and any other integrated peripheral devices (e.g., a trap; a remote detonation; a lock; a siren; or a activate a command on a capturing device 025 associated with the source such as, but not limited to, an operation of the capturing device 025). Accordingly, an action to be triggered upon an alert may be defined as a parameter associated with the zone, content source and/or target object.

3. Specifying Target Objects for Tracking 230

Embodiments of the present disclosure may enable a user 005 to define target objects to be tracked for each content source and/or zone. In some embodiments, a user 005 may select a target object from an object list populated by platform 001. The object list may be obtained from all the models the AI engine 100 has trained, by any user 005. Crowd sourcing training from each user's 005 usage of public object training of target objects may improve target object recognition for all platform users 005.

In some embodiments, however, object profiles may remain private and limited to one or more users 005. User 005 may be enabled to define a custom target object, and undergo AI engine 100 training, as disclosed herein, or otherwise.

Furthermore, as a user 005 may specify target objects to trigger alerts, so may a user 005 specify target objects to exclude from triggering alerts. In this way, a user 005 may not be notified if any otherwise detected object matches a target object list.

4. Activating Zone Monitoring 235

Having defined the parameters for tracking target objects, platform 001 may now begin monitoring content sources for the defined target objects. In some embodiments, a user 005 may enable or disable monitoring by zone or content source. Once enabled, the interface layer 015 may provide a plurality functions with regard to each monitored zone.

Figure 15:
FIG. 15 illustrates screen captures of yet another user interface consistent with some embodiments the present disclosure.
Figure 16:
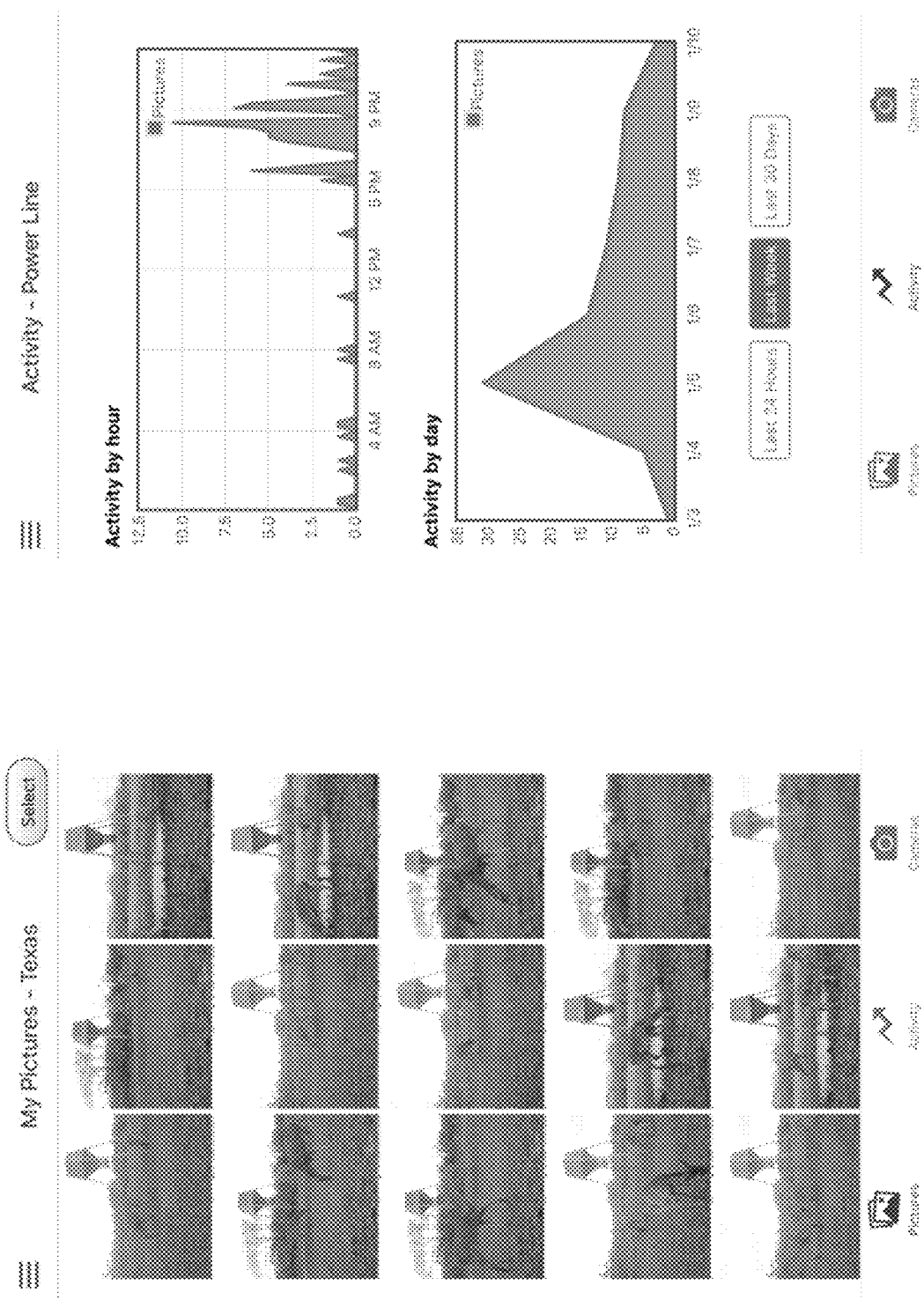
FIG. 16 illustrates screen captures of yet another user interface consistent with some embodiments the present disclosure.
Figure 17:
FIG. 17 illustrates image data consistent with some embodiments the present disclosure.
Figure 18:
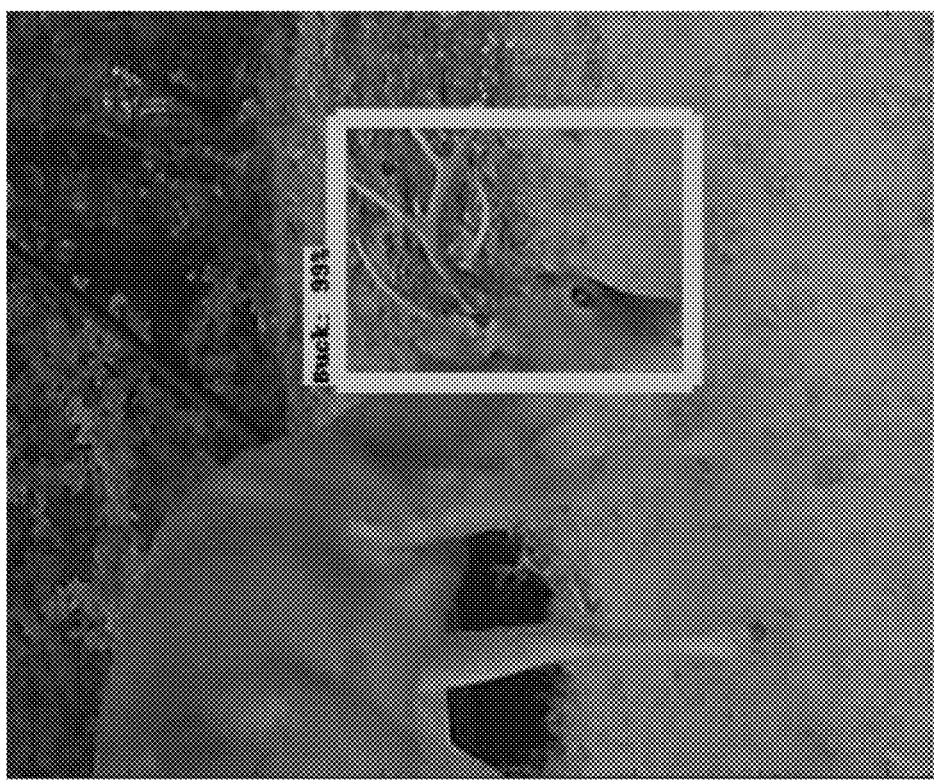
FIG. 18 illustrates additional image data consistent with some embodiments the present disclosure.
Figure 19:
FIG. 19 illustrates more image data consistent with some embodiments the present disclosure.
Figure 20:
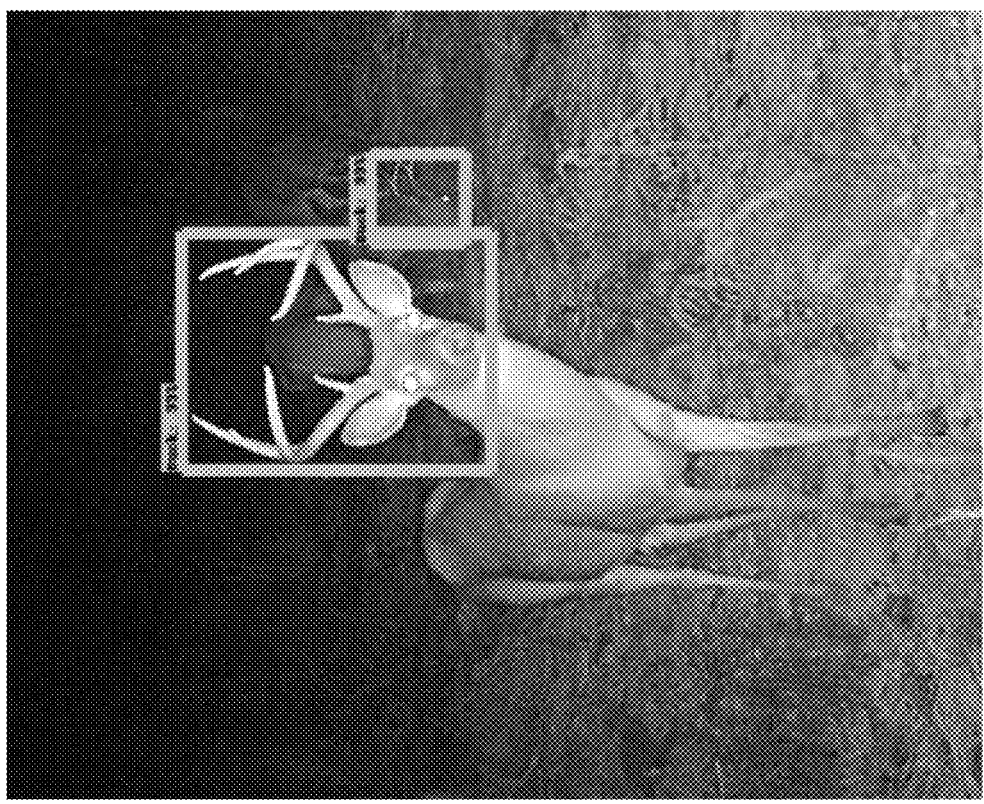
FIG. 020 illustrates yet more image data consistent with some embodiments the present disclosure.
Figure 21:
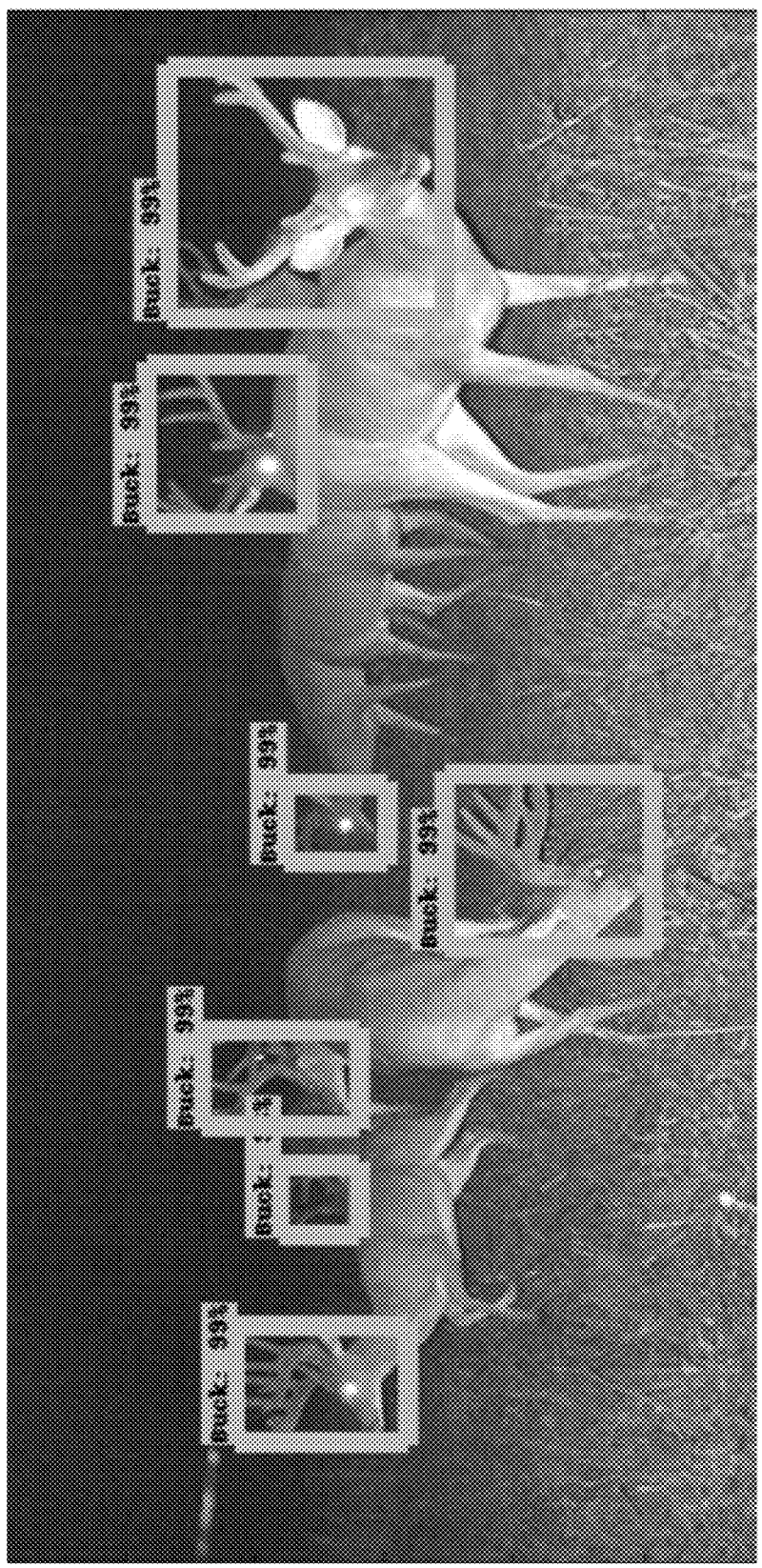
FIG. 21 illustrates even more image data consistent with some embodiments the present disclosure.

For example, a user 005 may be enabled to monitor the AI engine 100 in real time, review historical data, and make modifications. The interface layer 015 may expose a user 005 to a multitude of data points and actions, for example, but not limited to, viewing any stream in real time (FIG. 15) and reviewing recognized target objects (FIG. 16). Since the platform 001 keeps a record of every recognized target object, a user 005 can review this record and associated metadata, such as, but not limited to:

A. Time of event;

B. Category of target;

C. Geo-location of target; and

D. Target parameters.

Furthermore, since the platform 001 keeps track of the target objects, a user 005 may follow each target object in real time. For example, upon a detection of a tracked object within a first content source (e.g., a first camera), platform 001 may be configured to display each content source in which the target object is currently active (either synchronously or sequentially switching as the target object travels from one content source to the next). In some embodiments, the platform 001 may calculate and provide statistics about the target objects being tracked, for example, but not limited to:

A. Time of day target is most likely to be detected;

B. Most likely location of target;

C. Proportion of males to females of a specific animal Target Object;

D. Average speed of the Target Object; and

E. Distribution of ages of Target Objects.

Still consistent with embodiments of the present disclosure, a user 005 may designate select content to be sent back to AI engine 100 for further training.

D. Target Object Recognition

Figure 8:
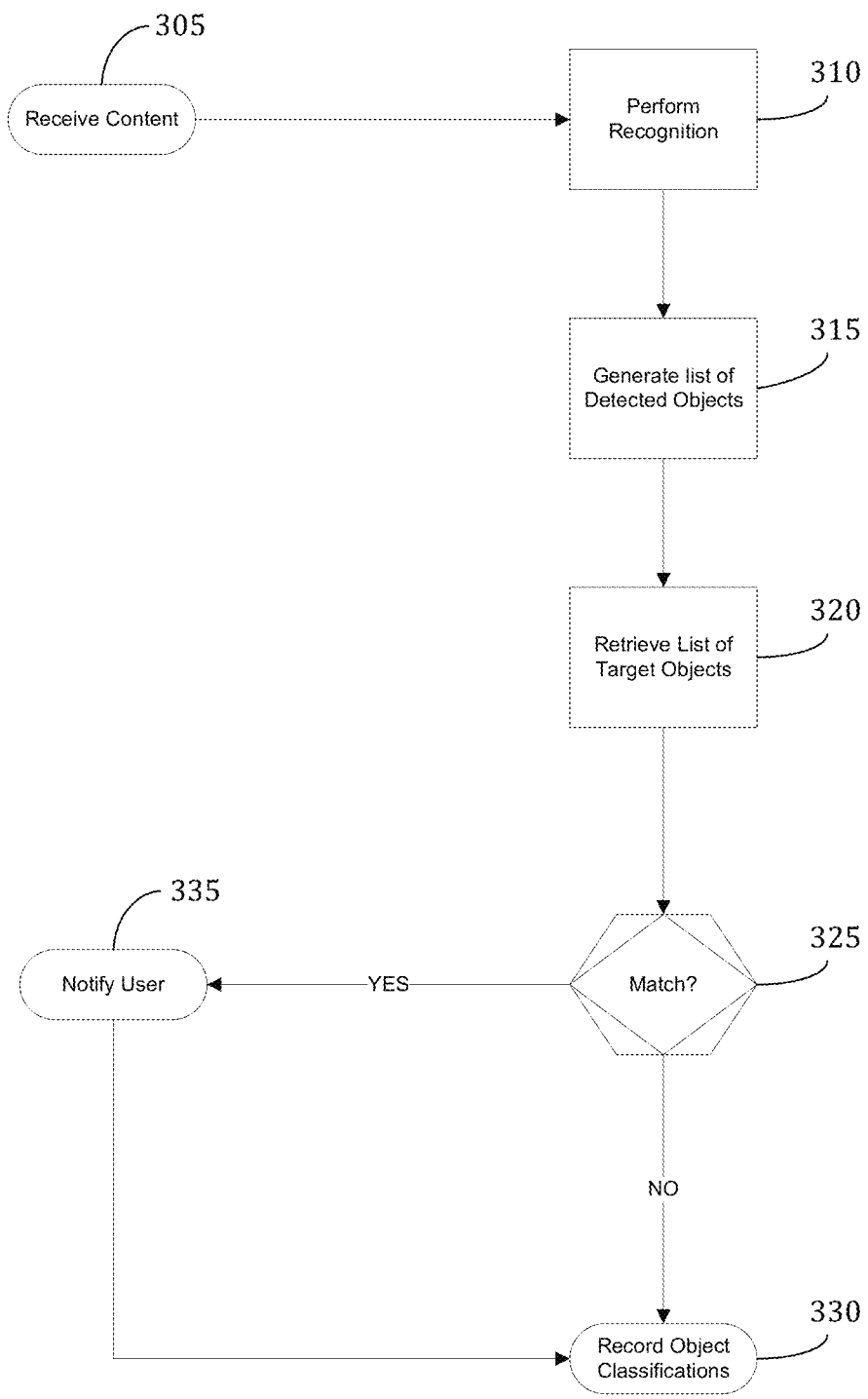
FIG. 8 is a flow chart of a method for performing object recognition consistent with some embodiments the present disclosure.
Figure 9:
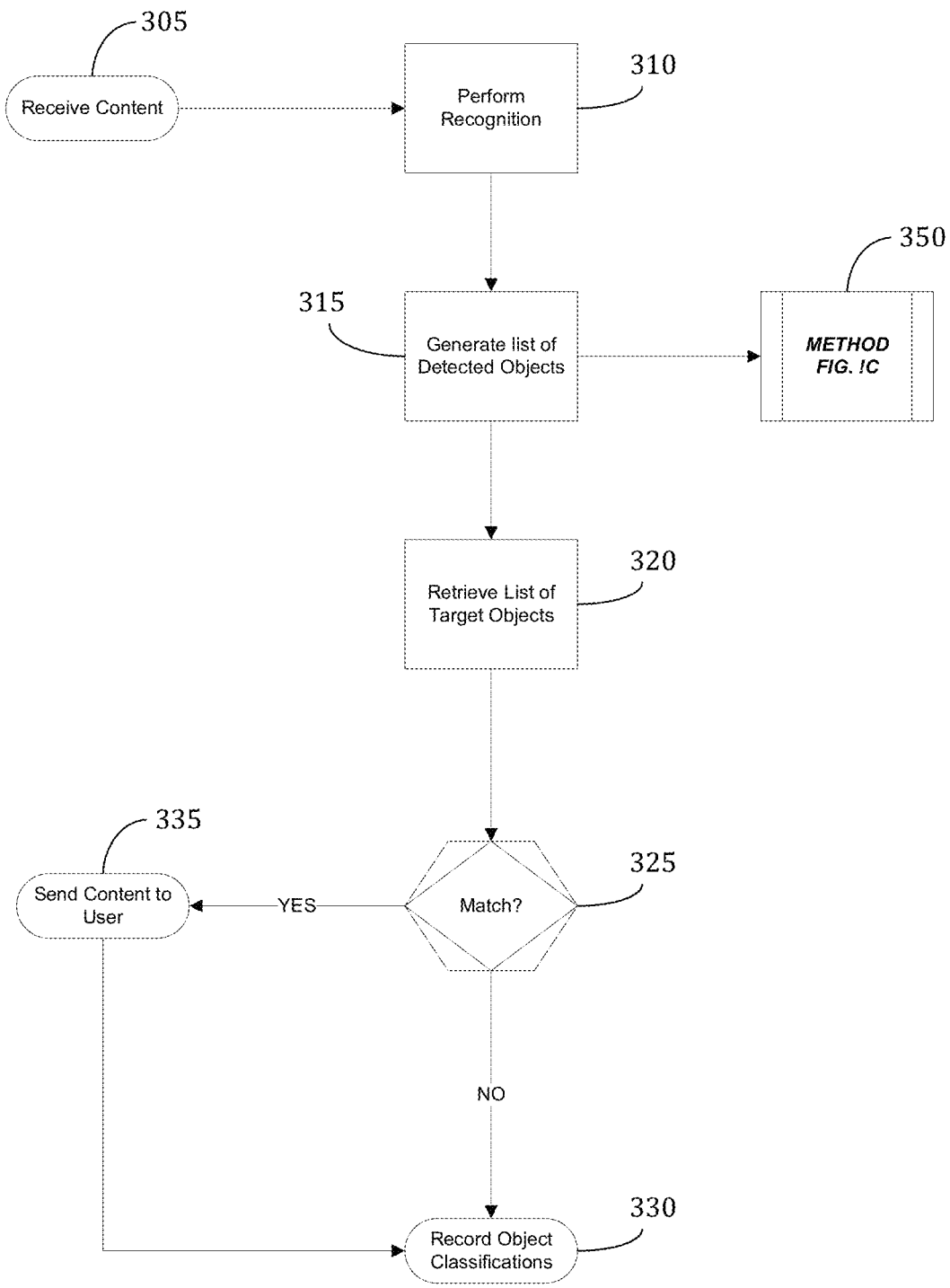
FIG. 9 is a flow chart of another method for performing object recognition consistent with some embodiments the present disclosure.

FIGS. 8-9 illustrate methods for target object recognition. In these methods, the platform 001 may receive inputs from content module 055, processes them with the AI Engine 100 to perform target object recognition, then provide a user 005 with the outputs as indicated in, for example, FIG. 3.

1. Receiving Content from Content Source 305

In a first stage, AI engine 100 may receive content from content module 055. The content may be received from, for example, but not limited to, configured capturing devices, streams, or uploaded content.

2. Performing Content Recognition 310

Consistent with embodiments of the present disclosure, AI engine 100 may be trained to recognize objects from a content source. Object detection may be based on a universal set of objects for which AI engine 100 has been trained, whether or not defined to be tracked within the designated zone associated with the content source.

3. Generating List of Detected Target Objects 315

As target objects are detected, AI engine 100 may generate a list of detected target objects. In some embodiments consistent with the present disclosure, all objects and trained attributes may be recorded, whether they are specifically targeted or not. Furthermore, in certain cases, the detected objects may be sent back for feedback loop review 350, as illustrated in the method in FIG. 10.

4. Retrieving List of Target Objects 320

AI engine 100 may then compare the list of detected target objects to the specified target objects to track and/or generate alerts for with regard to an associated content source or zone.

5. Checking for a Match 325

When a match has been detected, the platform 001 may trigger the designated alert for the content source or zone.

This may include a storing of the content source data at, for example, the data layer 020. The data may comprise, for example, but not limited to, a capture of a still frame, or a sequence of frames in a video format with the associated metadata.

In some embodiments, the content may then be provided to a user 005. For example, platform 001 may notify interested parties and/or provide the detected content to the interested parties at a stage 335. That is, platform 001 may enable a user 005 to access content detected in real time through the monitoring systems, the interface layer 015, and methods disclosed herein.

6. Recording Object Classifications 330

Figure 10:
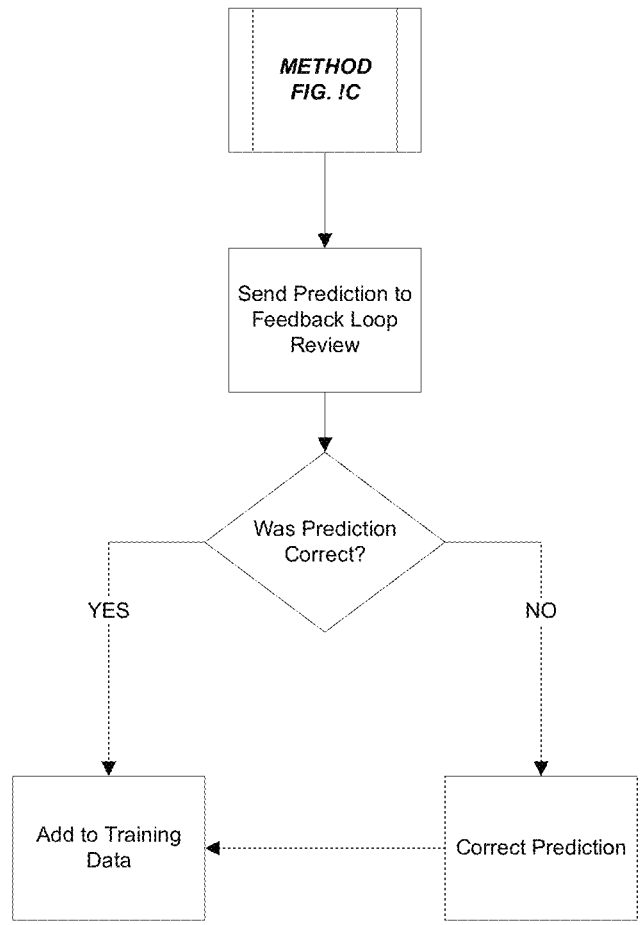
FIG. 10 is a flow chart of a method for updating training data consistent with some embodiments the present disclosure.

AI engine 100 may record detected classified target objects in the data layer 020. FIG. 10 discloses one method of integrating target object training during the target object recognition process and may reference back to the feedback loop indicated in FIG. 4.

IV. Computing Device Architecture

Platform 001 may be embodied as, for example, but not be limited to, a website, a web application, a desktop application, backend application, and a mobile application compatible with a computing device 900. The computing device 900 may comprise, but not be limited to the following:

Mobile computing device such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device; Platform 001 may be hosted on a centralized server or a cloud computing service.

Although methods have been described to be performed by a computing device 900, it should be understood that, in some embodiments, different operations may be performed by a plurality of the computing devices 900 in operative communication over one or more networks.

Embodiments of the present disclosure may comprise a system having a central processing unit (CPU) 920, a bus 930, a memory unit 940, a power supply unit (PSU) 950, and one or more Input/Output (I/O) units. The CPU 920 coupled to the memory unit 940 and the plurality of I/O units 960 via the bus 930, all of which are powered by the PSU 950. It should be understood that, in some embodiments, each disclosed unit may actually be a plurality of such units for the purposes of redundancy, high availability, and/or performance. The combination of the presently disclosed units is configured to perform the stages any method disclosed herein.

Figure 22:
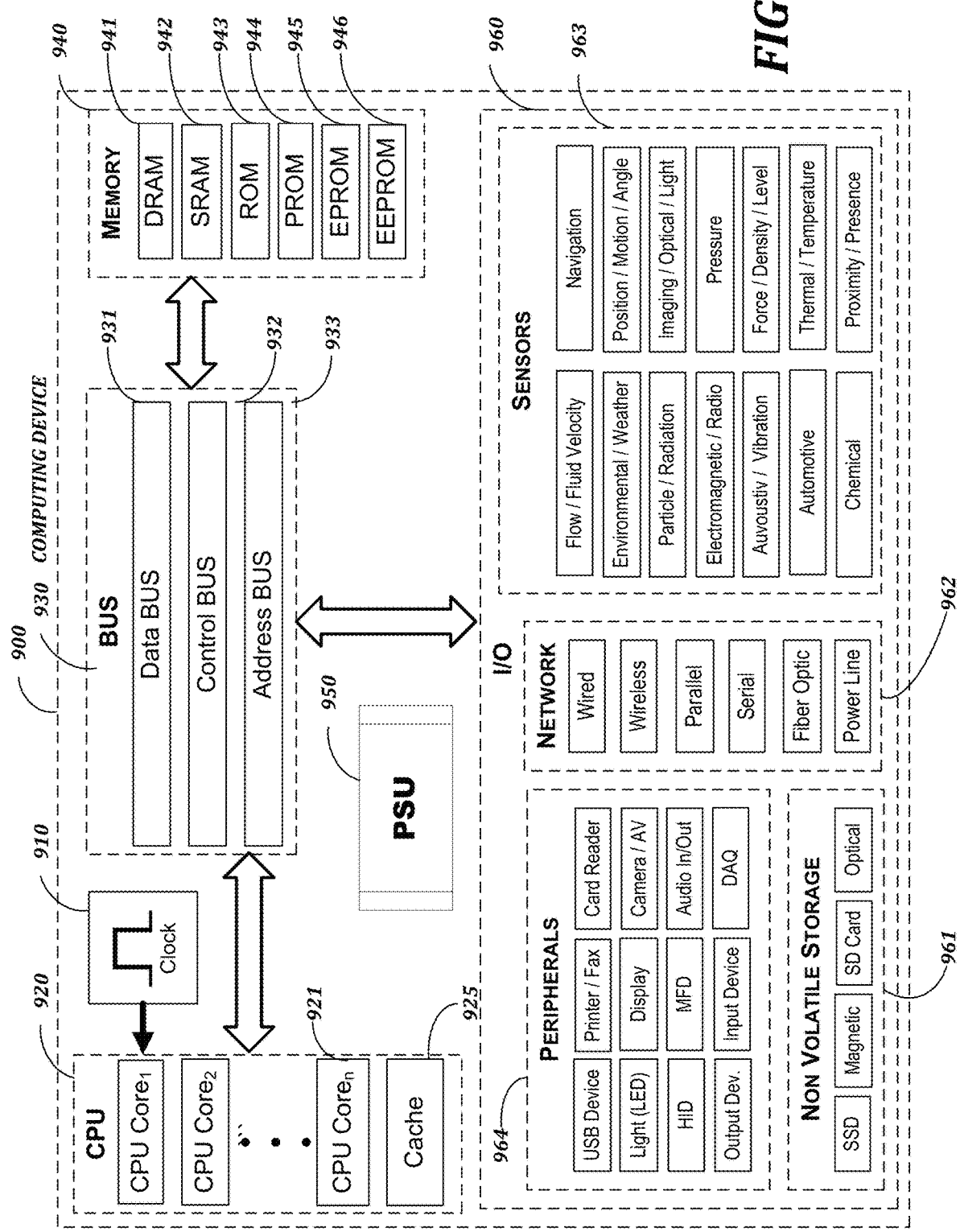
FIG. 22 is a block diagram of a system including a computing device for performing the various methods disclosed herein.

FIG. 22 is a block diagram of a system including computing device 900. Consistent with an embodiment of the disclosure, the aforementioned CPU 920, the bus 930, the memory unit 940, a PSU 950, and the plurality of I/O units 960 may be implemented in a computing device, such as computing device 900 of FIG. 22. Any suitable combination of hardware, software, or firmware may be used to implement the aforementioned units. For example, the CPU 920, the bus 930, and the memory unit 940 may be implemented with computing device 900 or any of other computing devices 900, in combination with computing device 900. The aforementioned system, device, and components are examples and other systems, devices, and components may comprise the aforementioned CPU 920, the bus 930, the memory unit 940, consistent with embodiments of the disclosure.

One or more computing devices 900 may be embodied as any of the computing elements illustrated in FIG. ˆA and 2, including, but not limited to, Capturing Devices 025, Data Store 020, Interface Layer 015 such as User and Admin interfaces, Recognition Module 065, Content Module 055, Analysis Module 075 and neural net. A computing device 900 does not need to be electronic, nor even have a CPU 920, nor bus 930, nor memory unit 940. The definition of the computing device 900 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 900, especially if the processing is purposeful.

With reference to FIG. 22, a system consistent with an embodiment of the disclosure may include a computing device, such as computing device 900. In a basic configuration, computing device 900 may include at least one clock module 910, at least one CPU 920, at least one bus 930, and at least one memory unit 940, at least one PSU 950, and at least one I/O 960 module, wherein I/O module may be comprised of, but not limited to a non-volatile storage sub-module 961, a communication sub-module 962, a sensors sub-module 963, and a peripherals sub-module 964.

A system consistent with an embodiment of the disclosure the computing device 900 may include the clock module 910 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 920, the central component of modern computers, which relies on a clock. The only exceptions are asynchronous circuits such as asynchronous CPUs. The clock 910 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 900 use a "clock multiplier" which multiplies a lower frequency external clock to the appropriate clock rate of the CPU 920. This allows the CPU 920 to operate at a much higher frequency than the rest of the computer, which affords performance gains in situations where the CPU 920 does not need to wait on an external factor (like memory 940 or input/output 960). Some embodiments of the clock 910 may include dynamic frequency change, where, the time between clock edges can vary widely from one edge to the next and back again.

A system consistent with an embodiment of the disclosure the computing device 900 may include the CPU unit 920 comprising at least one CPU Core 921. A plurality of CPU cores 921 may comprise identical the CPU cores 921, such as, but not limited to, homogeneous multi-core systems. It is also possible for the plurality of CPU cores 921 to comprise different the CPU cores 921, such as, but not limited to, heterogeneous multi-core systems, big.LITTLE systems and some AMD accelerated processing units (APU). The CPU unit 920 reads and executes program instructions which may be used across many application domains, for example, but not limited to, general purpose computing, embedded computing, network computing, digital signal processing (DSP), and graphics processing (GPU). The CPU unit 920 may run multiple instructions on separate CPU cores 921 at the same time. The CPU unit 920 may be integrated into at least one of a single integrated circuit die and multiple dies in a single chip package. The single integrated circuit die and multiple dies in a single chip package may contain a plurality of other aspects of the computing device 900, for example, but not limited to, the clock 910, the CPU 920, the bus 930, the memory 940, and I/O 960.

The CPU unit 921 may contain cache 922 such as, but not limited to, a level 1 cache, level 2 cache, level 3 cache or combination thereof. The aforementioned cache 922 may or may not be shared amongst a plurality of CPU cores 921. The cache 922 sharing comprises at least one of message passing and inter-core communication methods may be used for the at least one CPU Core 921 to communicate with the cache 922. The inter-core communication methods may comprise, but not limited to, bus, ring, two-dimensional mesh, and crossbar. The aforementioned CPU unit 920 may employ symmetric multiprocessing (SMP) design.

The plurality of the aforementioned CPU cores 921 may comprise soft microprocessor cores on a single field programmable gate array (FPGA), such as semiconductor intellectual property cores (IP Core). The plurality of CPU cores 921 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 921, for example, but not limited to Instruction-level parallelism (ILP) such as, but not limited to, super-scalar pipelining, and Thread-level parallelism (TLP).

Consistent with the embodiments of the present disclosure, the aforementioned computing device 900 may employ a communication system that transfers data between components inside the aforementioned computing device 900, and/or the plurality of computing devices 900. The aforementioned communication system will be known to a person having ordinary skill in the art as a bus 930. The bus 930 may embody internal and/or external plurality of hardware and software components, for example, but not limited to a wire, optical fiber, communication protocols, and any physical arrangement that provides the same logical function as a parallel electrical bus. The bus 930 may comprise at least one of, but not limited to a parallel bus, wherein the parallel bus carry data words in parallel on multiple wires, and a serial bus, wherein the serial bus carry data in bit-serial form. The bus 930 may embody a plurality of topologies, for example, but not limited to, a multidrop/electrical parallel topology, a daisy chain topology, and a connected by switched hubs, such as USB bus. The bus 930 may comprise a plurality of embodiments, for example, but not limited to Internal data bus (data bus) 931/Memory bus Control bus 932

Address bus 933

System Management Bus (SMBus)

Front-Side-Bus (FSB)

External Bus Interface (EBI)

Local bus

Expansion bus

Lightning bus

Controller Area Network (CAN bus)

Camera Link

ExpressCard

Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (i.g. PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA) including embodiments such as, but not limited to Extended ISA (EISA), PC/XT-bus/PC/AT-bus/PC/104 bus (e.g. PC/104-Plus, PCl/104-Express, PCl/104, and PCI-104), and Low Pin Count (LPC).

Music Instrument Digital Interface (MIDI)

Universal Serial Bus (USB) including embodiments such as, but not limited to, Media Transfer Protocol (MTP)/Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 900 may employ hardware integrated circuits that store information for immediate use in the computing device 900, know to the person having ordinary skill in the art as primary storage or memory 940. The memory 940 operates at high speed, distinguishing it from the non-volatile storage sub-module 961, which may be referred to as secondary or tertiary storage, which provides slow-to-access information but offers higher capacities at lower cost. The contents contained in memory 940, may be transferred to secondary storage via techniques such as, but not limited to, virtual memory and swap. The memory 940 may be associated with addressable semiconductor memory, such as integrated circuits consisting of silicon-based transistors, used for example as primary storage but also other purposes in the computing device 900. The memory 940 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

- Volatile memory which requires power to maintain stored information, for example, but not limited to, Dynamic Random-Access Memory (DRAM) 941, Static Random-Access Memory (SRAM) 942, CPU Cache memory 925, Advanced Random-Access Memory (A-RAM), and other types of primary storage such as Random-Access Memory (RAM).
- Non-volatile memory which can retain stored information even after power is removed, for example, but not limited to, Read-Only Memory (ROM) 943, Programmable ROM (PROM) 944, Erasable PROM (EPROM) 945, Electrically Erasable PROM (EEPROM) 946 (e.g. flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.
- Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 900 may employ the communication system between an information processing system, such as the computing device 900, and the outside world, for example, but not limited to, human, environment, and another computing device 900. The aforementioned communication system will be known to a person having ordinary skill in the art as I/O 960. The I/O module 960 regulates a plurality of inputs and outputs with regard to the computing device 900, wherein the inputs are a plurality of signals and data received by the computing device 900, and the outputs are the plurality of signals and data sent from the computing device 900. The I/O module 960 interfaces a plurality of hardware, such as, but not limited to, non-volatile storage 961, communication devices 962, sensors 963, and peripherals 964. The plurality of hardware is used by the at least one of, but not limited to, human, environment, and another computing device 900 to communicate with the present computing device 900. The I/O module 960 may comprise a plurality of forms, for example, but not limited to channel I/O, port-mapped I/O, asynchronous I/O, and Direct Memory Access (DMA).

Consistent with the embodiments of the present disclosure, the aforementioned computing device 900 may employ the non-volatile storage sub-module 961, which may be referred to by a person having ordinary skill in the art as one of secondary storage, external memory, tertiary storage, off-line storage, and auxiliary storage. The non-volatile storage sub-module 961 may not be accessed directly by the CPU 920 without using intermediate area in the memory 940. The non-volatile storage sub-module 961 does not lose data when power is removed and may be two orders of magnitude less costly than storage used in memory module, at the expense of speed and latency. The non-volatile storage sub-module 961 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (961) may comprise a plurality of embodiments, such as, but not limited to:

- Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO)
- Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, and Solid State Drive (SSD) and memristor
- Magnetic storage such as, but not limited to, Hard Disk Drive (HDD), tape drive, carousel memory, and Card Random-Access Memory (CRAM).
- Phase-change memory
- Holographic data storage such as Holographic Versatile Disk (HVD)
- Molecular Memory
- Deoxyribonucleic Acid (DNA) digital data storage Consistent with the embodiments of the present disclosure, the aforementioned computing device 900 may employ the communication sub-module 962 as a subset of the I/O 960, which may be referred to by a person having ordinary skill in the art as at least one of, but not limited to, computer network, data network, and network. The network allows computing devices 900 to exchange data using connections, which may be known to a person having ordinary skill in the art as data links, between network nodes. The nodes comprise network computer devices 900 that originate, route, and terminate data. The nodes are identified by network addresses and can include a plurality of hosts consistent with the embodiments of a computing device 900. The aforementioned embodiments include, but not limited to personal computers, phones, servers, drones, and networking devices such as, but not limited to, hubs, switches, routers, modems, and firewalls.

Two nodes can be said are networked together, when one computing device 900 is able to exchange information with the other computing device 900, whether or not they have a direct connection with each other. The communication sub-module 962 supports a plurality of applications and services, such as, but not limited to World Wide Web (WWW), digital video and audio, shared use of application and storage computing devices (900), printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g. TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g. Global System for Mobile Communications [GSM], General Packet Radio Service [GPRS], Code-Division Multiple Access [CDMA], and Integrated Digital Enhanced Network [IDEN]).

The communication sub-module 962 may comprise a plurality of size, topology, traffic control mechanism and organizational intent. The communication sub-module 962 may comprise a plurality of embodiments, such as, but not limited to

- Wired such as, but not limited to, coaxial cable, phone lines, twisted pair cables (ethernet), and InfiniBand.
- Wireless communications such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G
- Parallel communications such as, but not limited to, LPT ports.
- Serial communications such as, but not limited to, RS-232 and USB
- Fiber Optic communications such as, but not limited to, Single-mode optical fiber (SMF) and Multi-mode optical fiber (MMF)
- Power Line communications The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 900 may employ the sensors sub-module 963 as a subset of the I/O 960. The sensors sub-module 963 comprises at least one of the devices, modules, and subsystems whose purpose is to detect events or changes in its environment and send the information to the computing device 900. Sensors are sensitive to the measured property, are not sensitive to any property not measured, but may be encountered in its application, and do not significantly influence the measured property. The sensors sub-module 963 may comprise a plurality of digital devices and analog devices, wherein if an analog device is used, an Analog to Digital (A-to-D) converter must be employed to interface the said device with the computing device 900. The sensors may be subject to a plurality of deviations that limit sensor accuracy. The sensors sub-module 963 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

- Chemical sensors such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).
- Automotive sensors such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.
- Acoustic, sound and vibration sensors such as, but not limited to, microphone, lace sensor (guitar pickup), seismometer, sound locator, geophone, and hydrophone.
- Electric current, electric potential, magnetic, and radio sensors such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.
- Environmental, weather, moisture, and humidity sensors such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.
- Flow and fluid velocity sensors such as, but not limited to, air flow meter, anemometer, flow sensor, gas meter, mass flow sensor, and water meter.

Ionizing radiation and particle sensors such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors such as, but not limited to, accelerometer, displacement sensor, flex sensor, free fall sensor, gravimeter, impact sensor, laser rangefinder, LIDAR, odometer, photoelectric sensor, position sensor such as GPS or Glonass, angular rate sensor, shock detector, ultrasonic sensor, tilt sensor, tachometer, ultra-wideband radar, variable reluctance sensor, and velocity receiver.

Imaging, optical and light sensors such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors such as, but not limited to, bhangmeter, hydrometer, force gauge/force sensor, level sensor, load cell, magnetic level/nuclear density/strain gauge, piezocapacitive pressure sensor, piezo-electric sensor, torque sensor, and viscometer.

Thermal and temperature sensors such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 900 may employ the peripherals sub-module 962 as a subset of the I/O 960. The peripheral sub-module 964 comprises ancillary devices uses to put information into and get information out of the computing device 900. There are 3 categories of devices comprising the peripheral sub-module 964, which exist based on their relationship with the computing device 900, input devices, output devices, and input/output devices.

Input devices send at least one of data and instructions to the computing device 900. Input devices can be categorized based on, but not limited to:

Modality of input such as, but not limited to, mechanical motion, audio, and visual Whether the input is discrete, such as but not limited to, pressing a key, or continuous such as, but not limited to position of a mouse The number of degrees of freedom involved such as, but not limited to, two-dimensional mice vs three-dimensional mice used for Computer-Aided Design (CAD) applications Output devices provide output from the computing device 900. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 964:

Input Devices

Human Interface Devices (HID), such as, but not limited to, pointing device (e.g. mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 900. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 900 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data AcQuisition (DAQ) devices covert at least one of analog signals and physical parameters to digital values for processing by the computing device 900. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:
  Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, and Refreshable Braille Display/Braille Terminal.
  Printers such as, but not limited to, inkjet printers, laser printers, 3D printers, and plotters.
  Audio and Video (AV) devices such as, but not limited to, speakers, headphones, and lights, which include lamps, strobes, DJ lighting, stage lighting, architectural lighting, special effect lighting, and lasers.
  Other devices such as Digital to Analog Converter (DAC)
Input/Output Devices may further comprise, but not be limited to, touchscreens, networking device (e.g. devices disclosed in network 962 sub-module), data storage device (non-volatile storage 961), facsimile (FAX), and graphics/sound cards.

V. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A method comprising:
  receiving a content stream from a content source, the content source comprising at least one of the following:
    a capturing device, and
    a uniform resource locator;
  defining at least one zone, wherein the at least one zone represents a location associated with the content stream;
  associating a plurality of content streams with the at least one zone, the plurality of content streams being associated with at least two content sources;
  establishing at least one target object to detect within the content stream of the plurality of content streams associated with the at least one zone, wherein establishing the at least one target object to detect comprises:
    retrieving at least one target object profile from a database of learned target object profiles, wherein at least one learned target object profile is associated with the at least one target object to detect, and wherein the database of learned target object profiles is associated with target objects that have been trained for detection within at least one frame of the content stream;
  analyzing the at least one frame associated with the content strum, wherein analyzing the at least one frame comprises:
    detecting, employing a neural net, the at least one target object within the at least one frame by matching aspects of the at least one frame to aspects of the at least one learned target object profile;
  establishing at least one parameter for communicating target object detection related data, wherein the at least one parameter specifies the following:
    at least one aspect of the at least one detected target object, and
    at least one aspect of the content source; and
  communicating the target object detection related data when the at least one parameter is met, wherein communicating the target object detection related data comprises at least one of the following:
    transmitting the at least one frame along with annotations associated with the detected at least one target object, and
    transmitting a notification based on, at least in part, the target object detection related data.

2. The method of claim 1, wherein defining the at least one zone further comprises:
  specifying at least one content source for association with the at least one zone, and
  specifying at least one content stream associated with the at least one content source, the specified at least one content stream to be processed by an AI engine for the at least one zone.

3. The method of claim 2, wherein associating the at least one zone with the plurality of content sources comprises associating the at least one zone with a plurality of capturing devices.

4. The method of claim 1, wherein receiving the content stream from the content sources comprises receiving the content stream from a website.

5. The method of claim 1, wherein receiving the content stream from the content sources comprises receiving the content stream as uploaded by an end-user.

6. The method of claim 1, wherein receiving the content stream from the content sources comprises receiving the content stream from at least one content distribution platform.

7. The method of claim 1, further comprising:
  specifying at least one detection parameter from a plurality of detection parameters for the at least one zone, wherein specifying the at least one detection parameter comprises specifying from a plurality of selectable target object designations for detection within the at least one zone, the target object designations being associated with a plurality of learned target object profiles; and
  specifying at least one alert parameter from a plurality of alert parameters for the at least one zone, wherein the alert parameters comprise at least one of the following:
    triggers for an issuance of an alert,
    recipients that receive the alert,
    actions to be performed when the alert is triggered, and
    restrictions on issuing the alert.

8. The method of claim 7, wherein specifying the at least one alert parameter comprises defining at least one of minimum, maximum, and exact quantity of the detected target objects.

9. The method of claim 7, wherein specifying the at least one alert parameter comprises defining at least one of minimum, maximum, and exact frequency of the detected target objects.

10. The method of claim 7, wherein specifying the at least one alert parameter comprises defining at least one of minimum, maximum, and exact duration of the detected target objects.

11. The method of claim 7, wherein specifying the at least one alert parameter comprises defining at least one of minimum, maximum, and exact group size of the detected target objects.

12. The method of claim 7, wherein specifying the at least one alert parameter comprises defining at least one of minimum, maximum, and exact score of the detected target objects.

13. The method of claim 7, wherein specifying the at least one alert parameter comprises defining at least one of minimum, maximum, and exact age of the detected target objects.

14. The method of claim 7, wherein specifying the at least one alert parameter comprises defining a gender of the detected target objects.

15. The method of claim 7, wherein specifying the at least one alert parameter comprises defining a diseased status of the detected target objects.

16. The method of claim 7, wherein specifying the at least one alert parameter comprises defining at least one of minimum, maximum, and exact confidence level of the detected target objects.

17. The method of claim 7, wherein specifying the at least one alert parameter comprises defining at least one of before, after, and at a time of detection for issuing the at least one alert.

18. The method of claim 1, further comprising training to associated with the at least one learned target object profile, wherein training comprises:
receiving training content comprising at least one of the following: a live feed and uploaded content, wherein receiving the training content comprises receiving the training content from at least one of the following: media in the public domain, a wearable device, a handheld device, a professional device, a surveillance device, a remote device, and intermediary platform;
classifying the training content, wherein classifying the training content comprises at least one of the following: class, identity, symbol, features, gender, race, age, health, and score;
making evaluation predictions associated with classified training content;
calculating a precision of the classification; and
updating the learned target object profile.

19. The method of claim 18, further comprising transferring learning from a previous model.

20. The method of claim 18, wherein the training associated with the learned target object profile comprises random human reviews.

21. The method of claim 1, wherein detecting the at least one target object within the at least one frame further comprises retraining the neural net.

22. The method of claim 1, wherein analyzing the at least one frame comprises sending an analysis for human review.

23. The method of claim 1, further comprising tracking the at least one detected target object across a plurality of the capturing devices.

24. The method of claim 1, wherein analyzing the content comprises analyzing a behavior of the detected target object.

25. The method of claim 1, wherein analyzing the at least one frame comprises analyzing a posture of the detected target object.

26. The method of claim 1, wherein receiving the at least one target object profile from the database of learned target object profiles comprises receiving the at least one target object profile from the database of the learned target object profiles comprising target object profiles trained by a plurality of systems.

27. An AI Engine comprising:
a content module configured to:
receive a content stream from each of a plurality of content sources, and
associate at least one zone with at least two of the plurality of content streams, wherein the at least one zone represents a location associated with the content stream;
a recognition module configured to:
match aspects of the content stream to at least one learned target object profile from a database of learned target object profiles, and
upon a determination that at least one aspect of the content stream corresponds to the at least one learned target object profile:
classify the at least one aspect as at least one detected target object based on the at least one learned target object profile, and
update the at least one learned target object profile with at least one aspect of the at least one detected target object; and
an analysis module configured to:
process the at least one detected target object through a neural net for a detection of learned features associated with the at least one detected target object, wherein the learned features are specified by the at least one learned target object profile associated with the at least one detected target object,
determine at least one of the following:
a gender of the at least one detected target object,
an age of the at least one detected target object,
a health of the at least one detected target object, and
a score for the at least one detected target object, and
update the at least one learned target object profile with the detected learned features.

28. A system comprising:
at least one capturing device configured to:
register with an AI engine,
capture at least one of the following:
optical data, and
audio data,
digitize the captured data, and
transmit the digitized data as at least one content stream to the AI engine;
at least one end-user device configured to:
configure the at least one capturing device to be in operative communication with the AI engine,
define at least one zone, wherein the at least one zone represents a location, and wherein the at least one end-user device being configured to define the at least one zone comprises the at least one end-user device being configured to:
specify the at least one capturing device for association with the at least one zone,
specify the at least one content stream associated with the at least one content source,
specify at least one zone detection parameter of a plurality of zone detection parameters for the at least one zone, wherein the zone detection parameters comprise:

a plurality of selectable target object designations for detection within the at least one zone, the target object designations being associated with a plurality of learned target object profiles trained by the AI engine, and specify at least one zone alert parameter from a plurality of zone alert parameters for the at least one zone, wherein the zone alert parameters comprise at least one of the following:

triggers for an issuance of an alert, recipients that receive the alert, actions to be performed when the alert is triggered, and restrictions on issuing the alert, receive the alert from the AI engine, and display detected target object related data associated with the alert, wherein the detected target object related data comprises at least one frame from the at least one content stream associated with the at least one capturing device; and the AI engine comprising:

a content module configured to:

receive a plurality of content streams associated with a plurality of capturing devices associated with the at least one zone, a recognition module configured to:

match aspects of each content stream within the plurality of content streams to at least one learned target object profile from a database of learned target object profiles, and upon a determination that at least one aspect of the content stream corresponds to the at least one learned target object profile:

classify the at least one aspect as at least one detected target object based on the at least one learned target object profile, and update the at least one learned target object profile with at least one aspect of the at least one detected target object, an analysis module configured to:

process the at least one detected target object through a neural net for a detection of learned features associated with the at least one detected target object, wherein the learned features are specified by the at least one learned target object profile associated with the at least one detected target object, determine at least one of the following attributes of the at least one detected target object:

a gender of the at least one detected target object, an age of the at least one detected target object, a health of the at least one detected target object, and a score for the at least one detected target object, update the at least one learned target object profile with the detected learned features, determine whether the at least one detected target object corresponds to at least one of the target object designations associated with the at least one zone detection parameter specified at the end-user device, and determine whether at least one attribute associated with the at least one detected object correspond to the at least one zone alert parameter, and an interface layer configured to:

communicate detected target object related data to the at least one end-user device, wherein the detected target object related data comprises at least one of the following:

at least one frame along with annotations associated with the at least one detected target object, and a push notification to the at least one end-user device.

29. The system of claim 28, wherein the database of learned target object profiles comprises the learned target object profiles from an end-user's system profile.

30. The system of claim 28, wherein the database of learned target object profiles comprises the learned target object profiles from a plurality of other end-user's profiles.

* * * * *